United States Patent [19]
Miyawaki et al.

[11] Patent Number: 6,157,429
[45] Date of Patent: *Dec. 5, 2000

[54] MATRIX SUBSTRATE HAVING CONTINUOUS EVEN SURFACE IN DRIVE CIRCUIT OR SEALING REGION AS WELL AS DISPLAY REGION AND MANUFACTURING METHOD THEREOF

[75] Inventors: Mamoru Miyawaki, Isehara; Katsumi Kurematsu, Hiratsuka; Osamu Koyama, Hachioji; Yoshihiko Fukumoto, Isehara; Toru Nakazawa, Atsugi, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/953,730

[22] Filed: Oct. 17, 1997

[30] Foreign Application Priority Data

Oct. 18, 1996 [JP] Japan .................................. 8-276532
Oct. 13, 1997 [JP] Japan .................................. 9-279014

[51] Int. Cl.⁷ ...................... G02F 1/1333; G02F 1/1345; G02F 1/1339
[52] U.S. Cl. ........................... 349/138; 349/149; 349/153
[58] Field of Search .................... 349/138, 151, 349/149, 153

[56] References Cited

U.S. PATENT DOCUMENTS

| | | | |
|---|---|---|---|
| 5,227,900 | 7/1993 | Inaba et al. ............................. | 359/56 |
| 5,396,356 | 3/1995 | Fukuchi ................................... | 349/153 |
| 5,473,453 | 12/1995 | Kurematsu ............................... | 359/67 |
| 5,513,028 | 4/1996 | Sono et al. .............................. | 359/87 |
| 5,552,913 | 9/1996 | Shimizu et al. ......................... | 349/153 |
| 5,568,287 | 10/1996 | Shingaki et al. ........................ | 359/53 |
| 5,633,182 | 5/1997 | Miyawaki et al. ...................... | 438/30 |
| 5,666,176 | 9/1997 | Kurematsu ............................... | 349/95 |
| 5,691,794 | 11/1997 | Hoshi et al. ............................ | 349/158 |
| 5,708,486 | 1/1998 | Miyawaki et al. ...................... | 341/44 |
| 5,726,720 | 3/1998 | Watanabe et al. ...................... | 349/138 |
| 5,812,231 | 9/1998 | Kochi et al. ............................ | 349/151 |

FOREIGN PATENT DOCUMENTS

| | | |
|---|---|---|
| 7-104308 | 4/1995 | Japan . |
| 7-294958 | 11/1995 | Japan . |
| 8-179377 | 7/1996 | Japan . |
| 8178711 | 7/1996 | Japan . |
| 8179377 | 7/1996 | Japan . |
| 2 279 797 | 1/1995 | United Kingdom . |

*Primary Examiner*—William L. Sikes
*Assistant Examiner*—Tarifur R. Chowdhury
*Attorney, Agent, or Firm*—Fitzpatrick, Cella, Harper & Scinto

[57] ABSTRACT

A matrix substrate comprises a pixel region formed by arranging a plurality of pixel electrodes to a matrix, drive circuit regions for feeding said pixel electrodes with electric signals and sealing regions. The gaps separating the pixel electrodes are filled with insulation members of an insulating material to provide a continuous surface connecting those of the pixel electrodes and members of the material of the pixel electrodes and those of the material of the insulation members are arranged at least either in the drive circuit regions or in the sealing regions to provide a continuous surface there.

41 Claims, 26 Drawing Sheets

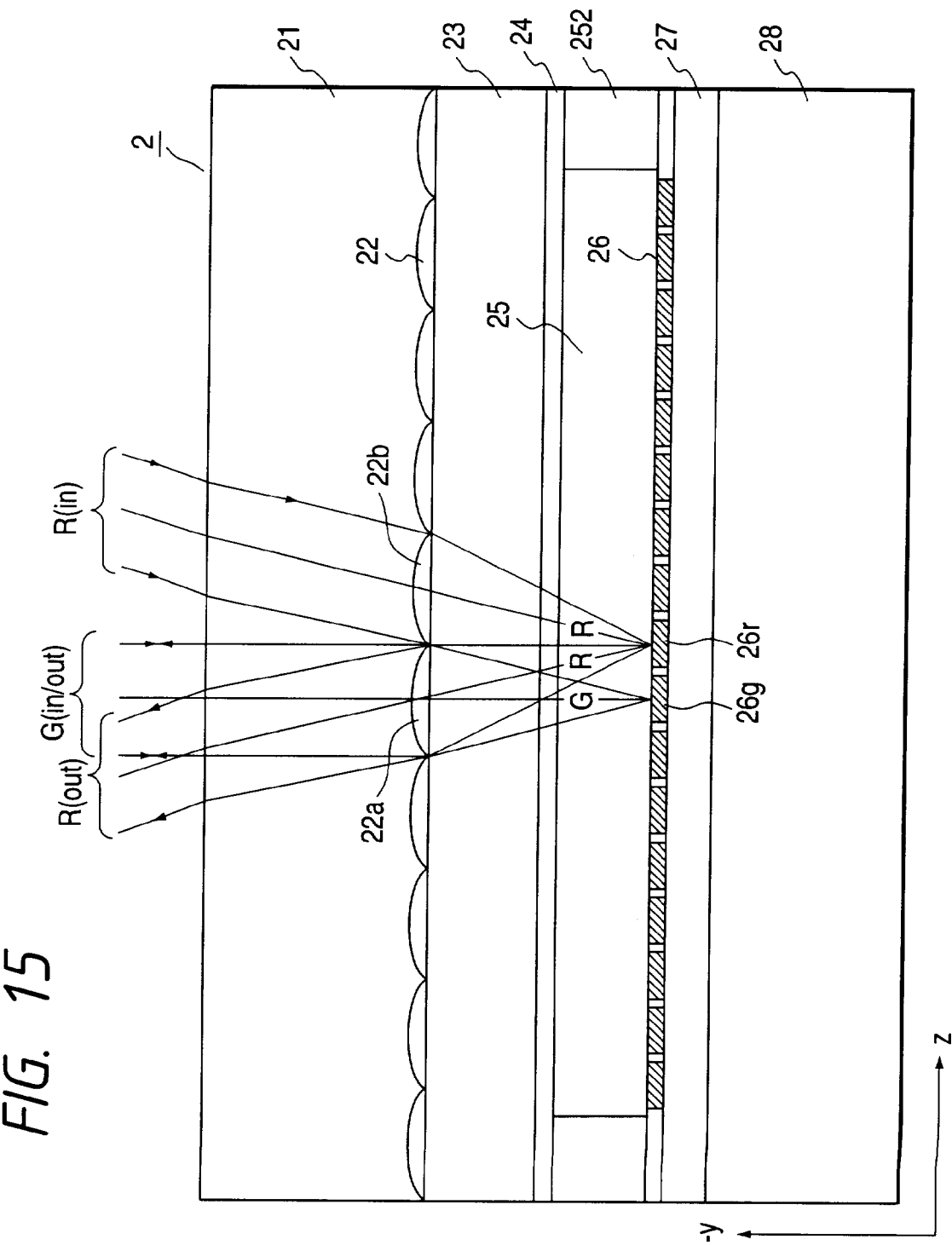

ORIGINAL COLOR (R/G/B MIXED)

MATRIX SUBSTRATE HAVING CONTINUOUS EVEN SURFACE IN DRIVE CIRCUIT OR SEALING REGION AS WELL AS DISPLAY REGION AND MANUFACTURING METHOD THEREOF

BACKGROUND OF THE INVENTION

1. Field of the Invention

This invention relates to a matrix substrate, to a liquid crystal apparatus comprising such a matrix substrate for displaying pictures and characters and also to a display apparatus comprising such a liquid crystal apparatus. It also relates to a method of manufacturing such a matrix substrate and such a liquid crystal apparatus.

2. Related Background Art

The current world has entered a so-called multi-media age and devices and equipment for exchanging pictorial information for communication purposes are playing an ever-increasingly important role in the world. In this tide, liquid crystal apparatus are attracting attention because they can be realized in a thin and portable form and consume only little power so that the industry of manufacturing such devices has grown as one of the major industries that is comparable with the semiconductor industry.

Liquid crystal apparatus are at present popularly used for so-called notebook size personal computers having a size as short as ten inches. Additionally, liquid crystal is expected to play a major role in displays of electronic work stations and home television sets that typically comprise a large display screen. However, a large display screen involves high manufacturing cost and is required to meet rigorous electric requirements for driving the large screen. As a rule of thumb, the manufacturing cost of a liquid crystal display panel is said to be proportional to the square or cube of the size of the screen.

Thus, as an alternative, a projection system designed to use a small liquid crystal panel and enlarge the image formed on it has been proposed. Such a system is made feasible mainly due to the recent development of finely sized semiconductor devices that operate excellently and can be manufactured at low cost. In view of the recent technological development, there is an increasing demand for small TFTs provided with a satisfactory drive power to be used in liquid crystal display panels comprising TFTs that use thin film transistors as switching devices for pixel electrodes. Additionally, TFTs using polycrystalline Si rather then amorphous Si are getting popularity. Video signals for the level of resolution meeting the NTSC standards that are used for the NTSC television system do not require high speed processing capabilities.

Therefore, not only TFTs but also components of peripheral circuits including shift registers and decoders may be made of polycrystalline Si to produce a liquid crystal display apparatus wherein a display region and peripheral drive circuits are integrally formed. However, polycrystalline Si is less performing than monocrystalline Si so that shift registers, for example, may have to be divided into a plurality of groups that are installed separately in order to realize a television set with a level of resolution higher than the level required by the NTSC standards or a computer display with the so-called XGA (extended graphics array) or SXGA (super extended graphics array) class of resolution. Then, noise can appear as ghost along the boundaries of the separated devices in the display region to provide a problem to be solved.

In an attempt to bypass this problem, display apparatus comprising a monocrystalline Si substrate having a high drive potential have been proposed to replace display apparatus of the above described integral type using polycrystalline Si. Since the drive potential of the transistors of the peripheral drive circuits of such display apparatus is satisfactory, the above described technique of dividing devices is not necessary here. Consequently, the S/N ratio of the lines connecting the display apparatus and the peripheral drive circuits has a large value and hence the noise problem can be successfully avoided.

Regardless of polycrystalline or monocrystalline Si, a reflection type liquid crystal apparatus comprising reflection type liquid crystal devices can be prepared by connecting the drain of the switching device of each pixel and the reflection electrode and arranging liquid crystal between the reflection electrode and a transparent common electrode.

A reflection type liquid crystal apparatus is adapted to display an image by means of rays of light reflected by the pixel electrodes of the apparatus so that it can effectively utilize light if compared with a transmission type liquid crystal apparatus that has to suppress light entering the semiconductor layer of switching devices while showing a large aperture to shield ratio.

On the other hand, the reflection type liquid crystal apparatus is required to have the pixel electrodes show a large reflectivity, which represents a requirement from which the transmission type liquid crystal apparatus is exempted. Japanese Patent Application Laid-Open No. 8-179377 (JPA 8-179377) is directed to this problem and proposes a technique for polishing pixel electrodes and passivation film for a liquid crystal apparatus by means of chemical mechanical polishing (CMP). The proposed technique will be summarized here by referring to FIGS. 27A and 27B of the accompanying drawings.

Referring to FIG. 27A, passivation film 2011 and pixel electrodes 2009 are polished by means of a polishing agent containing an etchant adapted to etch both the passivation film 2011 and the pixel electrodes 2009 until the pixel electrodes 2009 and the passivation film 2011 become flush with each other and mirror shine. Then, since the pixel electrodes 2009 and the passivation film 2011 are flush with each other, an orientation film can be formed directly on the pixel electrodes 2009 and an evenly distributed electric field can be applied to the liquid crystal due to the flat and smooth surface of the pixel electrodes 2009. The above cited JPA 8-179377 document points out that the surface of a liquid crystal panel polished by CMP can become droopy in peripheral areas and proposes the use of dummy pixels arranged between the drive circuit and the display pixel area of the liquid crystal apparatus. This will be summarily described below by referring to FIGS. 28A through 28D of the accompanying drawings.

Referring firstly to FIG. 28A showing a reflection type active matrix display panel, it comprises a substrate 2001, a display pixel area 2017 and signal scan/drive circuits 2018 arranged in the peripheral area of the display panel to show steps on the panel surface because of the difference in the height (thickness) between the display pixel area 2017 and the signal scan/drive circuits 2018. When the passivation film (oxide film) 2011 covering the stepped sections is polished by means of a polishing agent containing etchant for etching the oxide film, then the film can become droopy in peripheral areas surrounding the display pixel area 2017 as shown in FIG. 28B.

In order to prevent such droopy film, dummy pixels 2019 are arranged between the display pixel area 2017 and the signal scan/drive circuits 2018 to surround the display pixel area 2017 as illustrated in FIG. 28C. With this arrangement, while the oxide film may droop down to some extent from the step separating the display pixel area 2017 and the signal scan/drive circuits 2018, it is held substantially flat within the display pixel area 2017 as illustrated in FIG. 28D.

Meanwhile, the applicant of the present patent application proposed a method of manufacturing a display apparatus by using CMP in Japanese Patent Application No. 8-178711.

According to the above identified patent document, there is provided a method of manufacturing a display apparatus comprising an active matrix substrate on which each pixel electrode is provided with a switching transistor, an electrode substrate disposed opposite to the active matrix substrate and liquid crystal held between the substrates, wherein said method comprises a process of forming pixel electrodes that includes a chemical mechanical polishing step.

The above identified patent application also proposes a method of manufacturing a display apparatus, wherein an insulation layer is patterned to produce grooves therein and then a layer of the material of pixel electrodes is formed by deposition both in the grooves and on the insulation layer so that a continuous plane surface is produced on both the insulation layer and the layer of the material of pixel electrodes when the layer of the material of pixel electrodes is polished by CMP. With this technique, the gaps separating the pixel electrodes are satisfactorily filled with the insulation layer to eliminate any undulations on the surface that can give rise to irregular reflection and defective orientation and make it possible to display high quality images.

A major difference between the invention of Japanese Patent Application Laid-Open No. 8-179377 (JPA 08-179377) as described earlier and that of Japanese Patent Application No. 8-178711 filed by the applicant of the present patent application is that a passivation film 2011 is formed after forming a layer of the material of pixel electrodes 2009 and then they are polished by CMP according to JPA 08-179377, whereas an insulation layer is patterned to produce grooves therein and then a layer of the material of pixel electrodes is formed by deposition both in the grooves and on the insulation layer so that a continuous plane surface is produced on both the insulation layer and the layer of the material of pixel electrodes when the layer of the material of pixel electrodes is polished by CMP according to Application No. 8-178711. While JPA 8-179377 proposes dummy pixels to be formed between the pixel area and the drive circuits, it cannot eliminate a droopy surface on the peripheral areas.

On the other hand, while Application No. 8-178711 provides an excellent technique comprising a step of patterning an insulation layer to produce a matrix of grooves for depositing the material of pixel electrodes therein, it has been found that it is difficult to uniformly produce grooves for forming pixel electrodes without giving due consideration to resist to be applied to the pixel display region and the remaining peripheral areas and the pitch and the depth of the grooves.

This will be described by referring to FIGS. 26A and 26B of the accompanying drawings.

FIGS. 26A illustrates a stage of manufacturing a display apparatus according to Application No. 8-178711, where there have been formed on a substrate 201 an insulation layer 211 by deposition and grooves 280 for forming pixel electrodes in said insulation layer 211 after forming a semiconductor layer (not shown) to be used for pixel switching devices and drive circuit sections 260 for driving the switching devices and now the material of pixel electrodes 213 is deposited both in the grooves 280 and on the insulation layer 211. In FIG. 26A, reference numerals 250 and 270 respectively denote a pixel display region and a sealing region for sealing the liquid crystal material by using the active matrix substrate and the opposite substrate (not shown). Referring to FIG. 27A, while typically several to tens of several micrometers wide grooves 280 have to be regularly formed for pixel electrodes in the pixel display region 250, grooves do not have to be regularly formed on the drive circuit regions 260 and the sealing regions 270 so that the resist arrangement may differ between the pixel display region 250 and the remaining areas including the drive circuit regions 260 and the sealing regions 270. In other words, the grooves 280 may show different and uneven depths as illustrated in FIG. 26A unless due consideration is paid to resist to be applied to the pixel display region and the remaining peripheral areas and the pitch and the depth of the grooves. FIG. 26B shows the surface condition after a CMP operation and it will be found that the display region 250 and the remaining areas including the drive circuit regions 260 and the sealing regions 270 show difference in the thickness of the insulation layer 211.

SUMMARY OF THE INVENTION

In view of the above identified problem, it is therefore an object of the present invention to provide a matrix substrate that does not show any difference in the thickness between the pixel display region and the remaining areas including the drive circuit regions and the sealing regions.

Another object of the invention is to provide a liquid crystal apparatus that can display bright and high quality images that are free from blurs and color breakups.

Still another object of the invention is to provide a method of manufacturing a matrix substrate as described above and a liquid crystal apparatus comprising such a matrix substrate.

A further object of the present invention is to provide a matrix substrate comprising a pixel region formed by arranging a plurality of pixel electrodes to a matrix, drive circuit regions for feeding the pixel electrodes with electric signals and sealing regions, characterized in that the gaps separating the pixel electrodes are filled with insulation members of an insulating material to provide a continuous surface connecting those of the pixel electrodes and members of the material of the pixel electrodes and those of the material of the insulation members are arranged at least either in the drive circuit regions or in the sealing regions to provide a continuous surface there.

A still further object of the present invention is to provide a liquid crystal apparatus comprising a matrix substrate including a pixel region formed by arranging a plurality of pixel electrodes to a matrix, drive circuit regions for feeding the pixel electrodes with electric signals and sealing regions, an opposite substrate disposed vis-a-vis the pixel region and a liquid crystal material held between the pixel region and the opposite substrate, characterized in that the gaps separating the pixel electrodes are filled with insulation members of an insulating material to provide a continuous surface connecting those of the pixel electrodes and members of the material of the pixel electrodes and those of the material of the insulation members are arranged at least either in the drive circuit regions or in the sealing regions to provide a continuous surface there.

A still further object of the present invention is to provide a method of manufacturing a matrix substrate comprising a pixel region formed by arranging a plurality of pixel electrodes to a matrix, drive circuit regions for feeding the pixel electrodes with electric signals and sealing regions, characterized by comprising steps of forming a semiconductor device region to be connected with the pixel electrodes and the drive circuit regions on a substrate for forming a matrix substrate and subsequently forming an insulation layer on the semiconductor device region, the drive circuit regions and the regions for forming sealing regions, producing by patterning grooves for forming pixel electrodes in the insulation layer on the pixel region and those to be filled with the material of the pixel electrodes at least either in the insulation layer on the drive circuit regions or on the sealing regions, depositing the material of the pixel electrodes in the grooves of two different types, and polishing the surface of the deposit of the material of the pixel electrodes until the insulation layer and the material of the pixel electrode provide a continuous plane surface.

A still further object of the present invention is to provide a method of manufacturing a liquid crystal apparatus comprising a matrix substrate including a pixel region formed by arranging a plurality of pixel electrodes to a matrix, drive circuit regions for feeding the pixel electrodes with electric signals and sealing regions, an opposite substrate disposed vis-a-vis the pixel region and a liquid crystal material held between the pixel region and the opposite substrate, characterized by comprising steps of forming a semiconductor device region to be connected with the pixel electrodes and the drive circuit regions on a substrate for forming a matrix substrate and subsequently forming an insulation layer on the semiconductor device region, the drive circuit regions and the regions for forming sealing regions, producing by patterning grooves for forming pixel electrodes in the insulation layer on the pixel region and those to be filled with the material of the pixel electrodes at least either in the insulation layer on the drive circuit regions or on the sealing regions, depositing the material of the pixel electrodes in the grooves of two different types, and polishing the surface of the deposit of the material of the pixel electrodes until the insulation layer and the material of the pixel electrode provide a continuous plane surface.

Since the members of the material of the pixel electrodes and those of an insulating material are formed at least either in the drive circuit regions or in the sealing regions of a liquid crystal apparatus to form a continuous surface according to the invention, a surface planeness is secured not only in the pixel region but also at least in some of the peripheral areas to consequently improve the planeness of the pixel region itself. Thus, a liquid crystal apparatus according to the invention can display bright and high quality images that are free from blurs and color breakups.

BRIEF DESCRIPTION OF THE DRAWINGS

FIG. 15 is a schematic cross sectional view of a liquid crystal panel according to the invention.

DETAILED DESCRIPTION OF THE PREFERRED EMBODIMENTS

Figure 1:
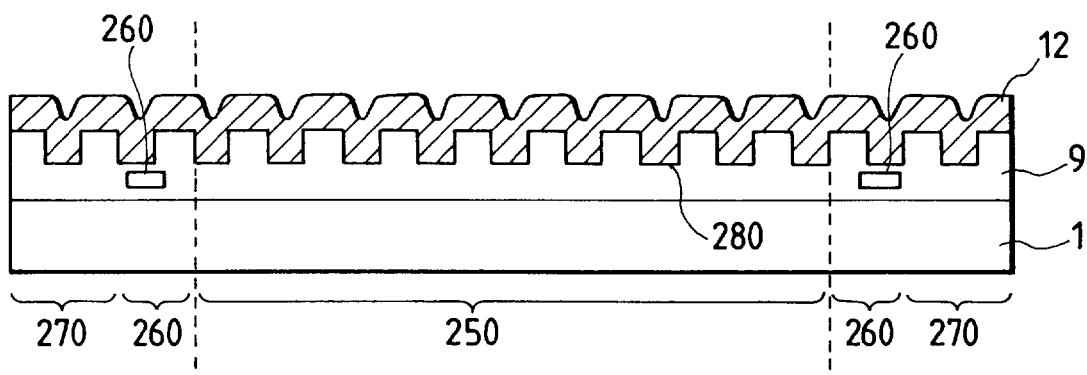
FIG. 1 is a schematic cross sectional view of a matrix substrate prior to a CMP operation.
Figure 2:
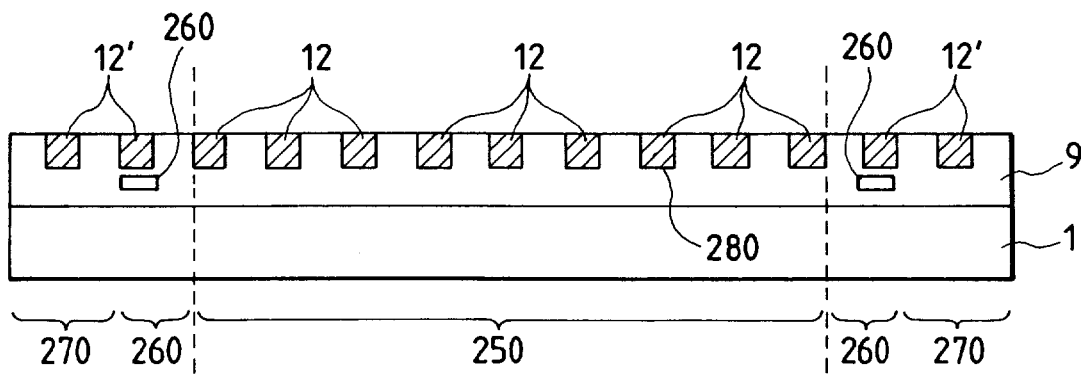
FIG. 2 is a schematic cross sectional view of a matrix substrate after a CMP operation.

Now, a matrix substrate according to the present invention will by described in detail by referring to FIGS. 1 and 2. FIG. 1 schematically illustrates a step of manufacturing a matrix substrate where an insulation layer 9 is formed on a substrate for forming a matrix substrate and grooves 280 are produced in the insulation layer 9 by patterning, in which the material of pixel electrodes is deposited. Referring to FIG. 1, note that the insulation layer 9 is formed after forming a semiconductor device region (not shown) where pixel switching devices are produced and drive circuits 260 for feeding the produced pixel switching devices with electric signals and that grooves are formed in the insulation layer 9 on the pixel display region 250, the drive circuit regions 260 and the sealing regions 270 (to be used for sealing the liquid crystal material held between an opposite substrate (not shown) and the pixel display region 250 of the matrix substrate) and are filled with the material of the pixel electrodes. It will be appreciated that, since grooves are regularly formed on the pixel display region 250, the drive circuit regions 260 and the sealing regions 270 so that the arrangement of resist does not differ between the pixel display region 250 and the remaining regions and the grooves in the insulation layer shows a uniform depth and a uniform width throughout the pixel display region and the remaining regions. It will also be appreciated that the material of the electrodes is deposited not only in the grooves 280 but also on the insulation layer 9 outside the grooves 280. FIG. 2 shows how the substrate of FIG. 1 appear when it is polished by CMP (chemical mechanical polishing). It will be seen from FIG. 2 that pixel electrodes 12 are arranged in the grooves formed in the pixel display region 250, whereas members 121 (which are inoperative electrodes typically because they are not electrically properly connected) of the material of the pixel electrodes are arranged in the grooves formed in the drive circuit regions 260 and the sealing regions 270. While the CMP technique will be described hereinafter, it should be noted there that the grooves 280 regularly arranged in the display region 250, the drive circuit regions 260 and the sealing regions 270 are filled with the material of the pixel electrodes and the material is polished by CMP (more specifically, after polishing the material of the pixel electrodes deposited on the insulation layer 9 outside the grooves 280, the material of the pixel electrodes filled in the grooves 280 and the insulation members arranged between the grooves are polished simultaneously) so that the pixel electrodes 12, the members 12' made of the material of the pixel electrodes and the insulation members (formed by the insulation layer 9) arranged side by side with the members 12 and 12' of the material of the pixel electrode provide a continuous and plane surface that is as smooth as mirror.

Thus, a liquid crystal apparatus comprising such a matrix substrate according to the invention can display high quality images improved in brightness and color uniformity.

As described above, members 12' made of the material of the pixel electrodes are arranged both in the drive circuit regions 260 and the sealing regions 270 in such a way that they provide a continuous surface with the neighboring insulation members. While this represents the most preferable and hence most effective mode of realizing the present invention, members 12' of the material of the pixel electrodes may alternatively be arranged either in the drive circuit regions 260 or the sealing regions 270 in such a way that they provide a continuous surface with the neighboring insulation members.

Preferably materials that can be used for the pixel electrodes of a matrix substrate according to the invention are those that can be polished without difficulty and provide a smooth surface having a high reflectivity. They include Al, AlSi, AlSiCu, AlGeCu and AlC that are commonly used for wiring as well as Ti, Ta, W, Cr, Au, Ag and compounds of any of these metals.

For the purpose of the present invention, the insulation layer in which grooves for disposing the material of the pixel electrodes are formed may be a film made of silicon oxide or any other insulation film or interlayer insulation film that are normally used in the technological field of semiconductors. Specific examples include $SiO_2$ film, silicon oxide film formed by plasma CVD, silicon oxide film formed by thermal CVD, silicon oxide film formed CVD using ozone-TEOS (tetraetoxy-silane) as raw material, PSG (phosphosilcate glass) film, NSG (nondope silicate glass) film and BPSG (boro-phospho-silicate glass) film. SiN film and $Ta_2O_5$ film may also be used for the insulation layer.

Now a technique preferably used for forming grooves to be filled with the material of the pixel electrodes in the insulation layer on the pixel display region, the drive circuit regions and the sealing regions by patterning will be described.

As described earlier, if the material of the pixel electrodes is formed only on the pixel display region and not on the drive circuit regions nor the sealing regions, the arrangement of resist shows difference between the pixel display region and the drive circuit and sealing regions so that the irregularity of the resist arrangement adversely affect the patterning operation. An oxide film type etching system such as a parallel plate plasma etching system involving the use of $CF_4/CHF_3$ gas is typically used when oxide film is used for the insulation layer.

Generally speaking, etching systems of this type are used for etching out small apertures occupying several to tens of several percents of the entire surface area, although 60 to 80% of the entire surface area of the insulation layer has to be etched to form apertures on a matrix substrate according to the invention because the material of the pixel electrodes has to be buried in areas other than the pixel display region.

While the reaction mechanism of an oxide film type etching system using $CF_4/CHF_3$ gas involves an emulative progress of etching and polymer deposition that is produced by resist, an insufficient supply of etchant can significantly affect the etching performance of the system particularly when large apertures have to be formed by etching as in the case of the present invention.

Figure 8A:
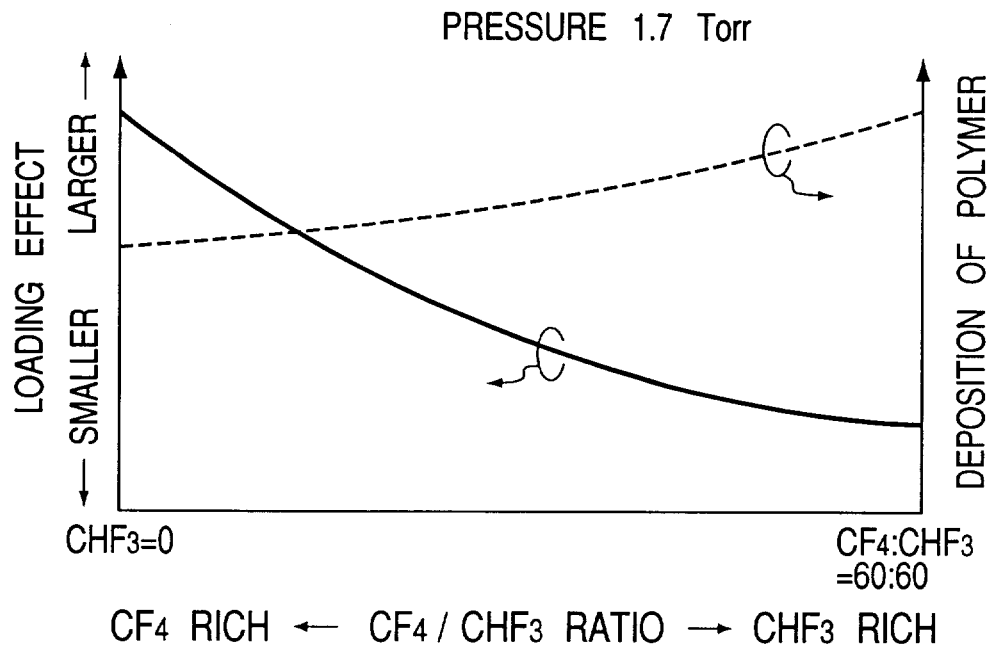
FIGS. 8A and 8B are graphs for determining the acceptability and non-acceptability of an etching operation to be used for manufacturing a liquid crystal apparatus according to the invention.
Figure 8B:
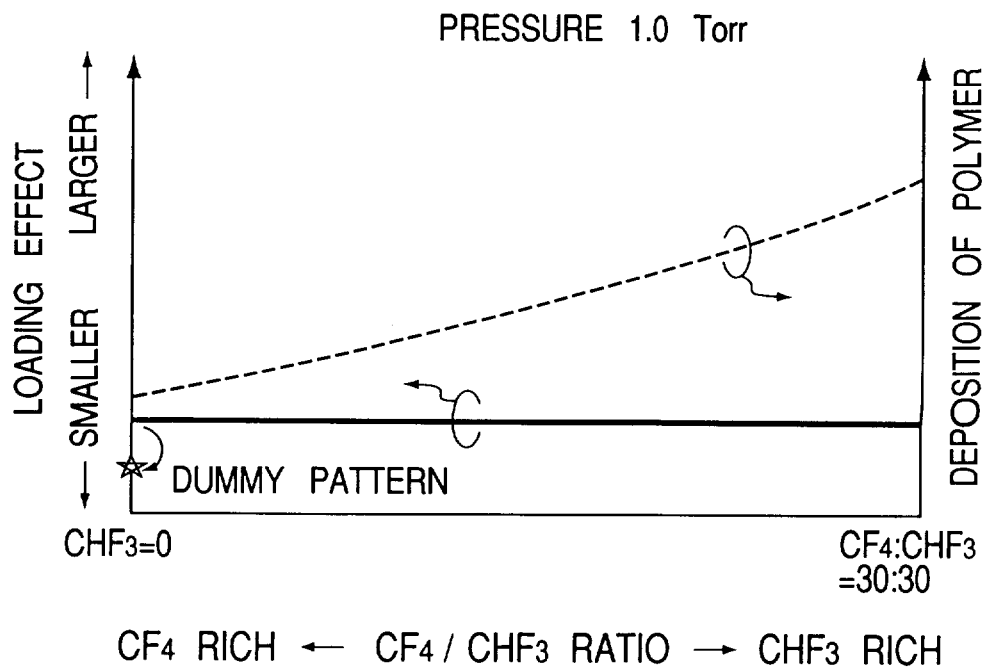

In view of this problem, the etching conditions of an oxide film type ($CF_4/CHF_3$ type) etching operation were studied in an experiment conducted by the inventors of the present invention. FIGS. 8A and 8B are graphs showing some of the results of the experiment. FIG. 8A illustrates the effect of an etching process using a total in-chamber pressure of 1.7 Torr, whereas FIG. 8B shows that of an etching process using a total in-chamber pressure of 1.0 Torr, which is designed for the purpose of the invention.

It will be seen from FIG. 8A that, while the polymer deposit is reduced by reducing the concentration of easily depositable $CHF_3$ gas under the total pressure of 1.7 Torr, the discrepancies (loading effect) in the etching rate between etched areas located close to the resist coat and areas located remote from the resist coat remarkably increase to make the process unfeasible.

On the other hand, as a result of a series of experiments where the pressure in the etching chamber is gradually reduced during the etching process, the inventors of the present invention discovered that the loading effect can be significantly suppressed when the pressure falls below 1.0 Torr and a remarkable etching effect can be achieved when the partial pressure of the easily depositable $CHF_3$ is reduced to nearly zero so that the etching process is conducted almost exclusively with $CF_4$.

In other words, as seen from FIG. 8B, the loading effect can be significantly suppressed when the pressure is reduced to below 1.0 Torr and a remarkable etching effect can be achieved to suppress deposition of polymers by using only $CF_4$, eliminating the use of $CHF_3$. Additionally, with the arrangement of forming pixel electrodes 12 only in the pixel display region, it was found that grooves are formed by etching only in the insulation layer of the display region so that practically no resist exists in the pixel display regions, whereas the peripheral areas are practically occupied by resist. Then, it is practically impossible to realize a stable etching performance because of a noticeable loading effect if the above conditions are met. To the contrary, with the arrangement of forming grooves not only in the pixel display region but also in the drive circuit regions and the sealing regions according to the invention, the loading effect can be remarkably suppressed to provide a stable etching performance.

A chemical mechanical polishing (CMP) technique that can be used for the purpose of the present invention utilizes both the chemical etching effect that can be obtained by the chemical components contained in the polishing agent with the mechanical polishing effect that the polishing agent can provide per se. For example, with a chemical mechanical polishing technique, the reaction product of the chemical components contained in the polishing agent with the material of the surface to be polished are mechanically removed by means of the polishing agent and a polishing rag. In a CMP process, the object to be polished is rigidly fitted to a revolvable polishing head and the surface of the object to be polished is pressed against a revolving platen (polishing surface plate). The platen carries a pad (polishing rage) on the surface and the object is polished by the slurry (polishing agent) soaked in the pad.

Various CMP apparatus are currently available and a CMP apparatus of any appropriate type may be used for the purpose of the invention.

CMP apparatus that can be used for the purpose of the invention include AVANTI472 (trade name: available from IPEC/PLANAR), CMP-II (trade name: available from Speedfam), EPO-113, EPO-114 (trade names: available from Ebara Corporation), MIRRA (trade name: available from APPLIED MATERIALS) and 6DS-SP (Trade name: available from STRASBAUGH).

Slurry products that can be used for the purpose of the invention include MSW-1000, XJFW-8048H, XJFW-8097B, XJFW-8099 (trade names: available from Rodel), SEMI-SPERSE W-A355, SEMI-SPERSE FE-10 (trade names: available from Cabot), PLANERLITE-5101, PLANERLITE-RD-93034, PLANERLITE-5102, PLANERLITE-RD-93035, PLANERLITE-5103, PLANERLITE-RD-93036 (trade names: available from FUJIMI), KLEBOSOL-20H12, KLEBOSOL-30H25, KLEBOSOL-30H50 KLEBOSOL-30N12, KLEBOSOL-30N25 and KLEBOSOL-30N50 (trade names: available from STI).

Polishing rag products that can be used for the purpose of the invention include IC-1000, IC-1400, IC-60, IC-53, IC-50, IC-45, IC-40, Suba 400, Suba 400H, Suba 500, Suba 600, Suba 800, MH S15A, MH S24A, MH C14A, MH C14B, MH C15A, MH C26A, MH N15A, MH N24A, Supreme RN-H, Supreme RN-R, Whitex W-H, Whitex W-S, UR-100, XHGM-1158 and XHGM-1167 (trade names: available from Rodel), Surfin XXX-5, Surfin 100, Surfin 260S, Surfin 000, Surfin 194, Surfin 191, Surfin 192, Surfin 2-X, Surfin 018-3, Surfin 018-0, Surfin 018, Surfin 200, Surfin 026, Surfin 024, Politex, Politex DG, Politex Supreme and Unicorfam (trade names: available from FUJIMI), SBL135, SBD1014, 6ZP09, RP3010P5, GQ8785, GQ9810, GQ9806, GQ9813, GQ1070, GQ1110 and GQ1300 (trade names: available from Teijin), 1000, 1000R, 1200, 1200R, 1300, 1400, 2000, 2010, 2020, 4100, 4300, 4400, 4500, 4600, 4800, 4900, 5100 and 5400 (trade names: available from NAPCON).

Now a process of manufacturing an active matrix substrate and a liquid crystal apparatus comprising such an active matrix substrate by CMP will be described by referring to FIGS. 11A through 11H, which show cross sectional views of the pixel region of an active matrix substrate in different manufacturing steps but does not show the drive circuit regions and the sealing regions. Note that drive circuit regions are formed simultaneously with semiconductor devices that operate as switching devices.

Figure 11A:
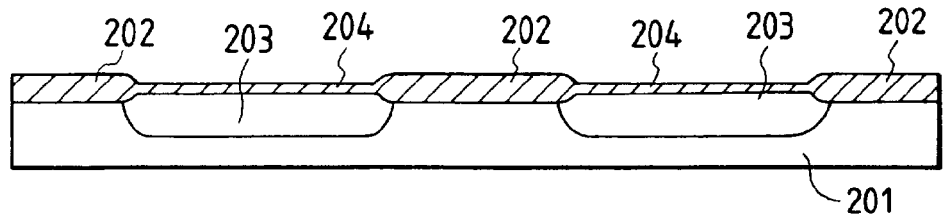
FIGS. 11A, 11B, 11C, 11D, 11E, 11F, 11G and 11H are schematic cross sectional views of a liquid crystal apparatus, showing different manufacturing steps of a method of manufacturing a liquid crystal apparatus according to the invention, using CMP.

An n-type silicon semiconductor substrate 201 with an impurity concentration level not exceeding $10^{15}$ cm$^{-3}$ is partially oxidized by heat to produce LOCOS 202. Then, boron ions are implanted to a dose of about $10^{12}$ cm$^{-2}$, using the LOCOS 202 as masks to produce PWLs 203 which are p-type impurity regions with an impurity concentration level of about $10^{16}$ cm$^{-3}$. Then, the substrate 201 is oxidized again by heat to produce a gate oxide film 204 having a film thickness not exceeding 1,000 angstroms (FIG. 11A).

Figure 11B:
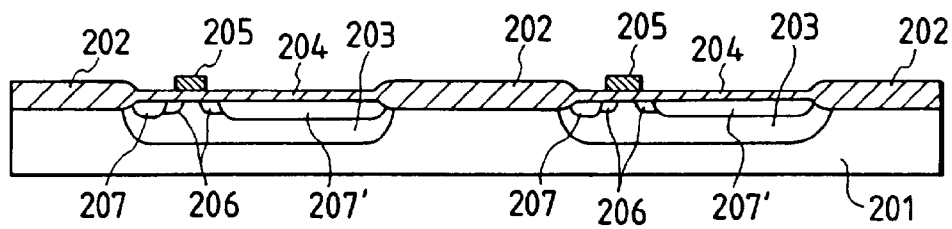

After forming gate electrodes 205 of n-type polysilicon that is doped with phosphor to a concentration level of $10^{20}$ cm$^{-3}$, phosphor ions are implanted into the entire substrate 201 to a dose of about $10^{12}$ cm$^{-2}$ to produce NLDs 206 which are n-type impurity regions with an impurity concentration level of about $10^{16}$ cm$^{-3}$. Subsequently, phosphor ions are implanted to a dose of about $10^{15}$ cm$^{-2}$, using a photoresist pattern as mask to produce source/drain regions 207, 207' with an impurity concentration level of about $10^{19}$ cm$^{-3}$ (FIG. 11B).

Then, PSG 208 is formed on the entire surface of the substrate 201 as interlayer film.

Figure 11C:
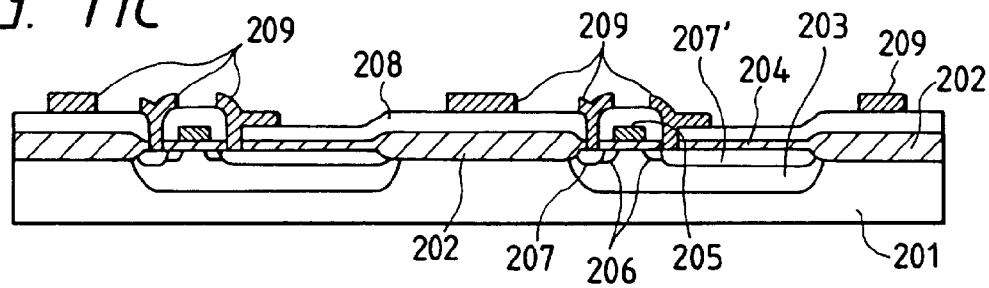

Contact holes are bored through the PSG 208 at positions right above the respective source/drain regions 207, 207' and an Al film is formed by evaporation by means of a sputtering technique. The Al film is then patterned to produce Al electrodes 209 (FIG. 11C). Preferably a barrier metal layer typically made of Ti/TiN is formed between the Al electrodes 209 and the source/drain regions 207, 207' in order to improve the ohmic contact characteristic of the Al electrodes 209 and the source/drain regions 207, 207'.

Figure 11D:
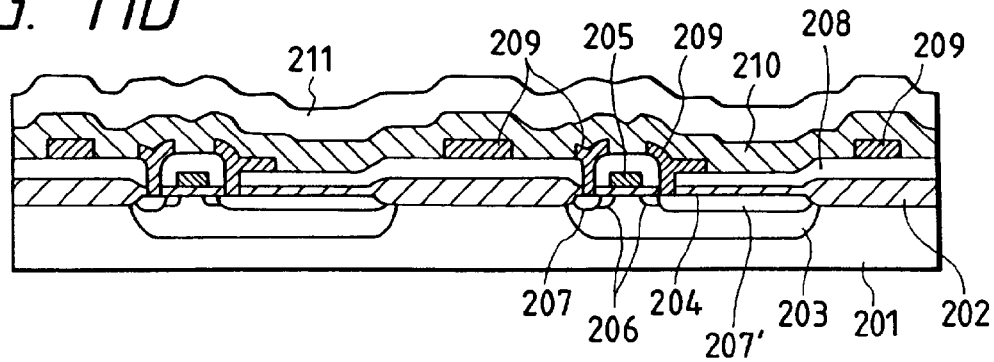
Figure 11E:
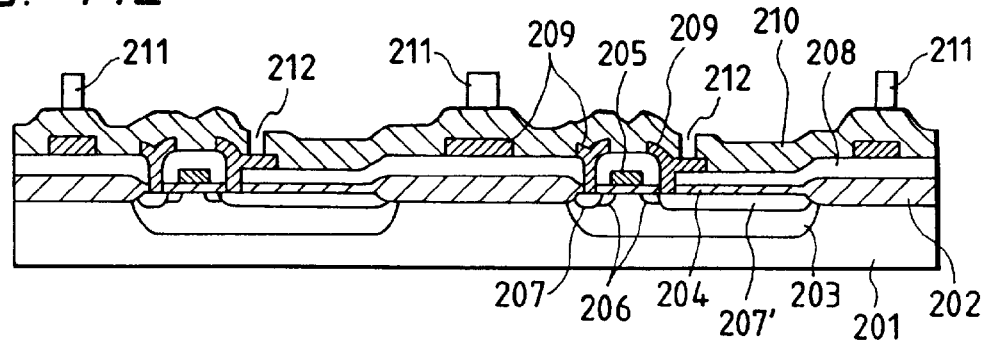

Then, a film of plasma SiN 210 and that of PSG 211 are sequentially formed on the entire surface of the substrate 201 to respective thicknesses of about 3,000 angstroms and 10,000 angstroms (FIG. 11D).

Thereafter, the PSG 211 is patterned to remain only in pixel isolating areas by using the plasma SiN layer 210 as dry etching stopper layer and then through holes 212 are patterned by dry etching right above the respective Al electrodes 209 that are held in contact with the respective drain regions 207'.

Figure 11F:
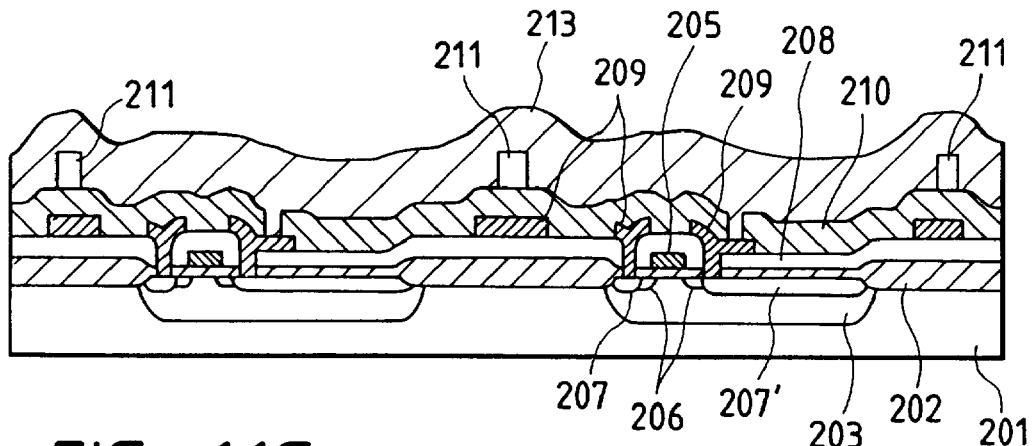

Then, pixel electrodes 213 typically made of Al are formed on the substrate 201 to a thickness greater than 10,000 angstroms by sputtering or EB (electron beam) evaporation (FIG. 11F).

Figure 11G:
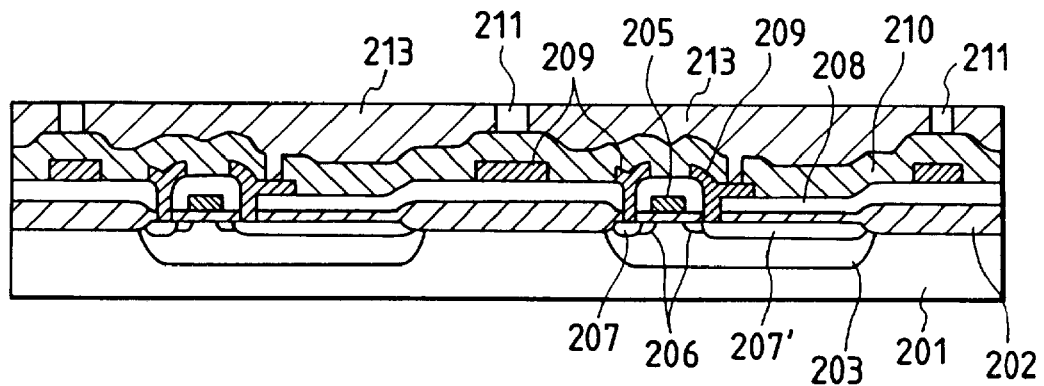

Then, the surface of the pixel electrodes 213 is polished by CMP (FIG. 11G). With this polishing operation, the surface of the members (not shown) of the material of the pixel electrodes buries in the drive circuit regions and the sealing regions is also polished.

More specifically, after polishing the members 213 of the material of the pixel electrodes formed beyond the pixel isolating areas of PSG 211 that are insulator members and operate as stoppers, the surface of the members of the material of the pixel electrodes and that of the insulator members 211 are polished until a continuous plane surface is produced.

In an experiment, CMP apparatus EPO-114 (trade name: available from Ebara Corporation) and polishing rag SUPREME RN-H (D51) (trade name: available from Rodel) were used with slurry PLANERLITE 5102 (trade name: available from FUJIMI).

Figure 11H:
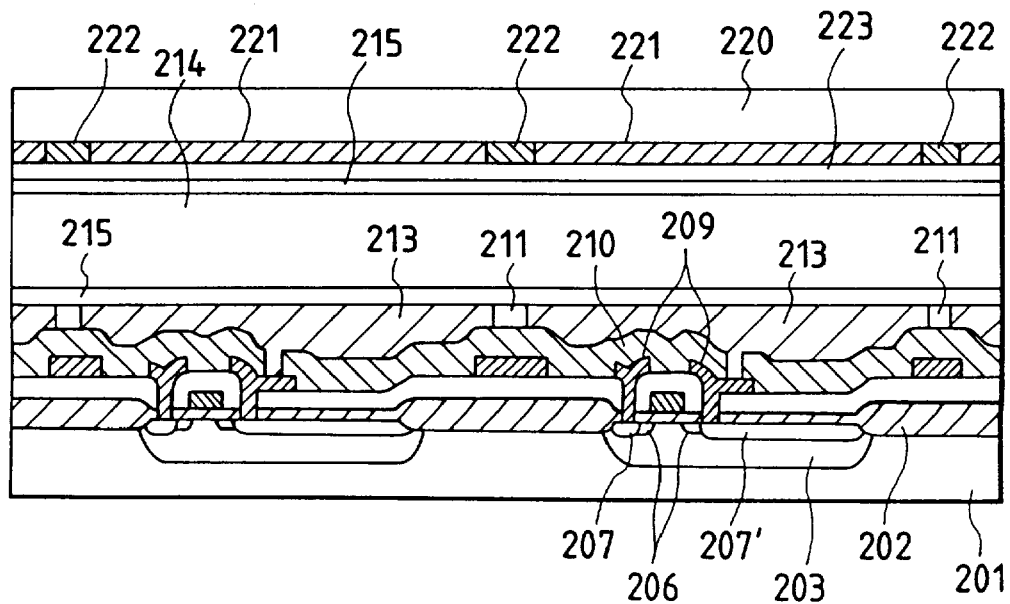

Then, an orientation film 215 is formed on the surface of the active matrix substrate and the surface of the film is processed for orientation typically by means of rubbing. Then, the active matrix substrate and an opposite substrate are bonded together with spacers (not shown) interposed therebetween and liquid crystal 214 is poured into the gap between the two substrates to produce a liquid crystal apparatus (FIG. 11H). Note that, in the illustrated apparatus, the opposite substrate is prepared by arranging color filters 221, a black matrix 222, a common electrode 223 typically made of ITO and an orientation film 215 on a transparent substrate 220.

Now, the process of driving a reflection type liquid crystal apparatus according to the invention and having the above described configuration will be briefly described. A signal voltage is applied to the source regions 207 by means of the peripheral drive circuits such as shift registers arranged on the substrate 201 and, at the same time, a gate voltage is applied to the gate electrodes 205 to turn on the switching transistors of the pixels and feed the drain regions 207' with a signal charge. The signal charge is stored in the capacitance of the pn junction depletion layer formed between the drain regions 207' and the PWLs 203 to apply a voltage to the pixel electrodes 213 by way of the respective Al electrodes 209. When the electric potential of the pixel electrodes 213 gets to an intended level, the voltage being applied to the gate electrodes 205 is removed to turn off the pixel switching transistors. Since the signal charge is stored in the pn junction capacitance as described above, the electric potential of the pixel electrodes 213 is held unchanged until the pixel switching transistors are driven for another time. The secured electric potential of the pixel electrodes 213 drive the liquid crystal 214 sealed in the gap between the substrate 201 and the opposite substrate 220 as shown in FIG. 11H.

As clearly seen from FIG. 11H, the above described active matrix substrate comprises pixel electrodes 213 having a smooth surface and the gaps separating the pixel electrodes are filled with an insulation layer. Additionally, since the members of the material of the pixel electrodes arranged in the drive circuit regions and the sealing regions (not shown) and insulation layer filling the gaps among the members are also made to show a plane surface, the liquid crystal apparatus can display high quality images as it is free from the problem of reduced efficiency of light utilization due to scattered incident light attributable to an undulated surface, poor contrast due to defective rubbing and appearance of emission lines due to a transversal electric field generated by the steps between pixel electrodes.

Now, the present invention will be described by way of embodiments, although the present invention is by no means limited thereto and the embodiments may be modified and/or used in combination whenever appropriate.

While these embodiments comprise semiconductor substrates, the present invention is not limited to the use of semiconductor substrates and ordinary transparent substrates (glass substrates) may alternatively be used for the matrix substrate. Additionally, while MOSFETs and TFTs are used for liquid crystal panels in the following description, two-terminal type devices such as diodes may alternatively be used. Embodiments of liquid crystal panels as described hereinafter may find applications including home television sets, projectors, head mount displays, 3-D image video game machines, lap-top computers, electronic notebooks, teleconferencing systems, car navigation systems and instrument panels of airplanes.

Embodiment 1

Figure 3:
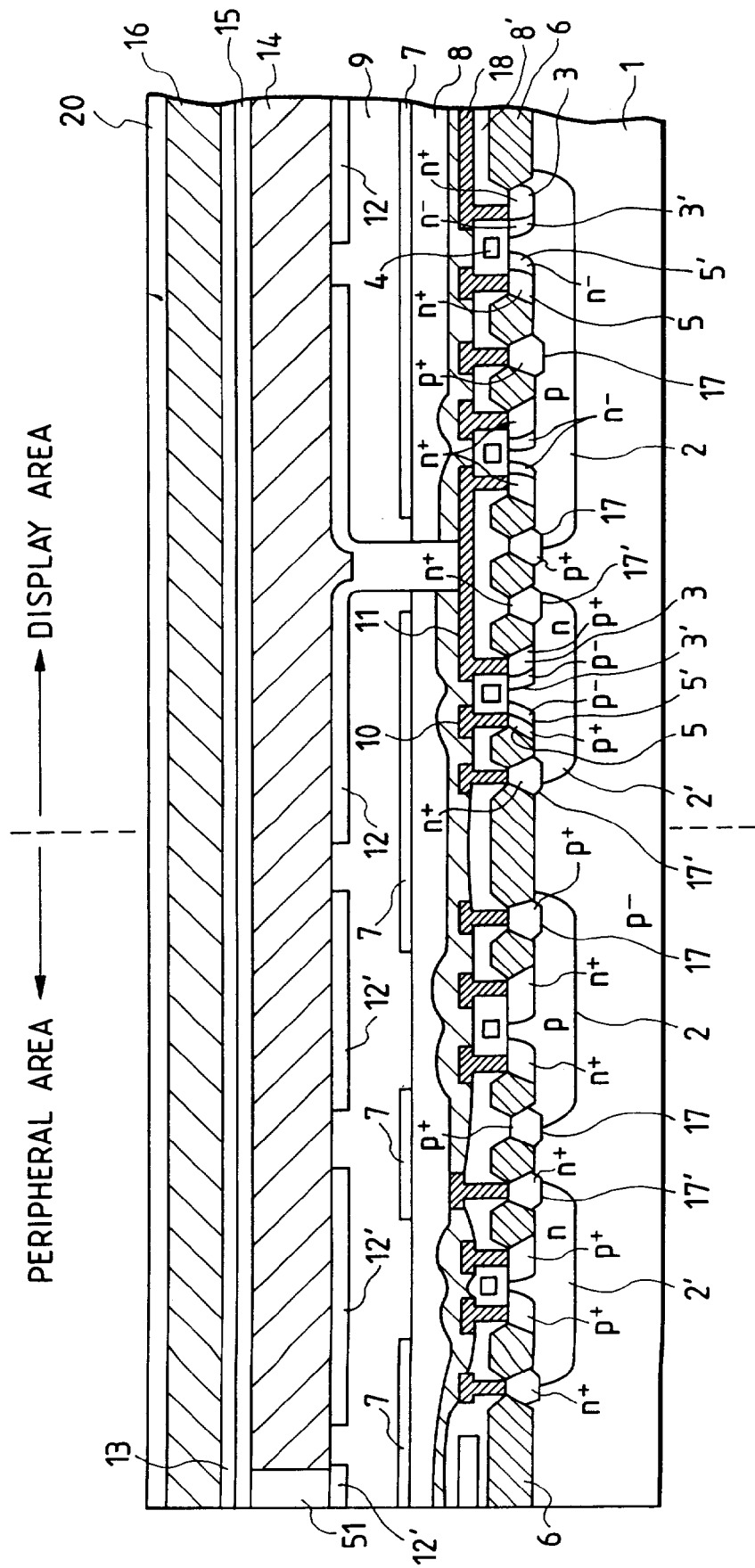
FIG. 3 is a schematic cross sectional view of a liquid crystal apparatus according to the invention and prepared by means of CMP.

FIG. 3 is a schematic cross sectional view of a typical liquid crystal panel according to the invention.

Referring to FIG. 3, there are shown a semiconductor substrate 1 and p-type and n-type wells 2 and 2' along with source regions 3, 3', gates 4 and drain regions 5, 5' of transistors.

As seen from FIG. 3, since a high voltage between 20 and 35V is applied to the transistors of the display region, the source/drain layer is not self-aligned with but offset from the gate electrode and low concentration $n^-$ and $p^-$ layers 3' and 5' are arranged therebetween. The offset is preferably between 0.5 and 2.0 $\mu$m. Meanwhile, part of the peripheral circuits is shown in FIG. 3. It will be seen that the gate is self-aligned with the source/drain layer in that part. The gate is aligned with the source/drain layer in part of the peripheral circuits because it comprises logic type circuits that may be driven only by 1.5 to 5V so that an aligned arrangement is desirable for using down-sized transistors and improving the effect of driving transistors. While the offset of the source/drain layer is described by referring to specific values, they may be modified and the gate length may be optimized to adapt itself to the withstand voltage.

The substrate 1 is made of a p-type semiconductor material and shows the lowest potential (normally the ground potential). A voltage to be applied to the pixels which is between 20 and 35V is also applied to the n-type well in the display region, whereas a logic drive voltage between 1.5 and 5V is applied to the logic section of the peripheral circuits. With this arrangement, the device can operate optimally for the voltages so that not only the chip size may be reduced but the pixels may be driven at high speed to display high quality images.

Otherwise, there are shown in FIG. 3 a field oxide film 6, an insulation layer 8' of PSG, NSG or BPSG, source electrodes 10 connected to respective data lines and drain electrodes 11 connected to respective pixel electrodes along with pixel electrodes 12 that also operate as reflectors. Reference symbol 12' denotes members of the material of the pixel electrodes formed in the drive circuit regions and the sealing regions. Reference numeral 7 denotes a light shielding layer covering the display region and the peripheral areas, which layer is preferably made of Ti, TiN, W or Mo and produced not only in the display region but also in the peripheral areas in a same step by vacuum evaporation or sputtering and patterning. Since the light shielding layer 7 covers substantially the entire surface of the chip, it can effectively block incident light to prevent operation errors on the part of the transistors due to leaks of light. As seen from FIG. 3, the light shielding layer 7 in the display region covers substantially the entire surface of the display region including the transistors but except the areas connecting the pixel electrodes 12 and the drain electrodes 11, whereas it is partly removed in the peripheral areas in regions where the line capacitance cannot preferably be large such as part of the video lines and the clock lines in an ingenious way so that high speed signals may be transferred without problem. If illumination light can get into the inside through areas where the light shielding layer 7 is removed to give rise to operational failures on the part of the circuits, those areas are to be covered by an electrode layer 12' arranged at the level of the pixel electrodes 12.

Reference numeral 8 denotes an insulation layer arranged under the light shielding layer 7 and comprising a P-SiO layer 18 (a SiO layer formed by plasma CVD) that is smoothed by means of SOG and another P-SiO or P-SiN layer as layer 8 covering it in order to ensure the insulation effect of the layer 8.

Reference numeral 9 denotes an insulation layer formed between the reflection electrode 12 and the light shielding layer 7 of each pixel and between the reflection electrodes 12 so that the charge holding capacitance between the pixel electrodes 12 and the shielding layer 7 is formed by way of this insulation layer. The insulation layer 9 is preferably be formed to a thickness of 500 to 20,000 angstroms on the light shielding layer 7 that is typically made of Ti, TiN, Mo or W. Note that a light shielding layer 7 is also formed in the peripheral areas from Ti, TiN, Mo or W in the step where its counterpart is formed in the display region 19. Also note that the insulation layer 9 is formed both in the peripheral areas and in the display region in a same step and so are the reflection electrodes 12.

Otherwise, there are shown a liquid crystal material 14, a common transparent electrode 15 opposing reflection electrodes 12, a transparent opposite substrate 16, highly concentrated impurity regions 17, and 17' and an anti-reflection film 20.

Reference numeral 13 in FIG. 3 denotes an anti-reflection film arranged between the common transparent electrode 15 and the opposite substrate 16 in order to reduce the interface reflectivity in view of the refractivity of the liquid crystal arranged there. The insulation film preferably has a refractivity lower than that of the opposite substrate 16 and also that of the transparent electrode 15.

As seen from FIG. 3, the highly concentrated impurity layers 17 and 17' have the type same as that of the wells 2 and 2' formed under the transistors and formed in and around the wells. With this arrangement, high quality images can be displayed if a high amplitude signal is applied to the source because the potential of the wells 2 and 2' is securely held to a desired level due to the provision of a low resistance layer. Additionally, the provision of the highly concentrated impurity layers 17 and 17' between the n-type wells 2' and the p-type wells 2 with a field oxide film interposed therebetween makes it unnecessary to arrange a channel stop layer that is normally placed directly under the field oxide film for ordinary MOS transistors.

Since the highly concentrated impurity layers 17, 17' can be formed during the process of preparing the source/drain regions, the number of masks and that of processing steps for forming the layers can be reduced to lower the overall manufacturing cost.

Figure 4:
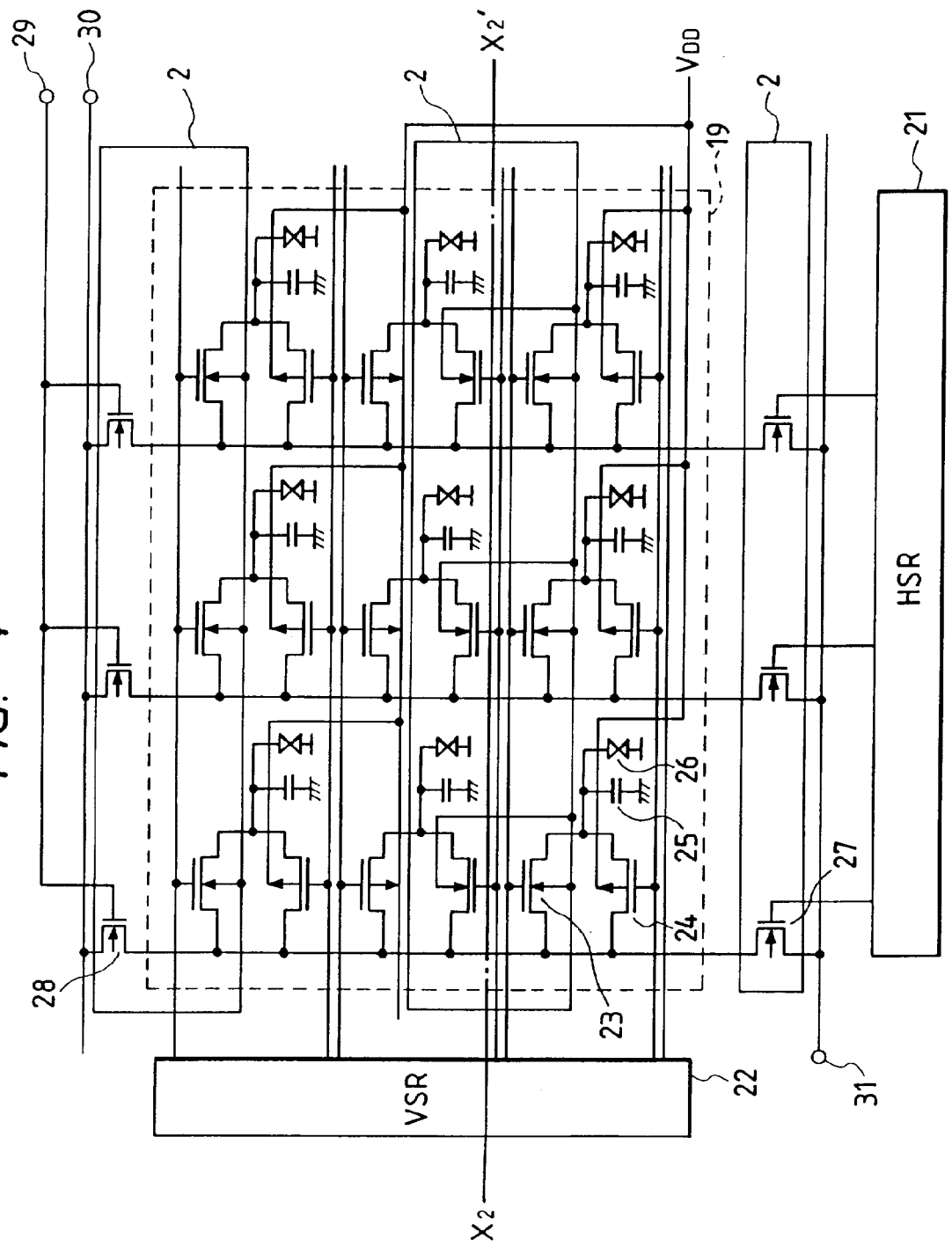
FIG. 4 is a schematic circuit diagram of a liquid crystal apparatus according to the invention.

FIG. 4 is a schematic circuit diagram of a liquid crystal display apparatus having a configuration as described above.

Referring to FIG. 4, there are shown a horizontal shift register (HSR) 21, a vertical shift register (VSR) 22, n-channel MOSFETs 23, p-channel MOSFETs 24, hold capacitances 25, a liquid crystal layer 26, signal transfer switches 27, reset switches 28, a reset pulse input terminal 29, a reset power supply terminal 30 and a video signal input terminal 31. Reference numeral 19 denotes a display region.

The hold capacitances 25 are those for holding respective signals between the pixel electrodes 12 and the common transparent electrode 15. The potential of the substrate is applied to the well regions 2. The transmission gates of the rows are so configured that the n-channel MOSFETs 23 are located above the respective p-channel MOSFETs 24 on the first row whereas the p-channel MOSFETs 24 are inversely located above the respective n-channel MOSFETs 23 on the second row; i.e. disposed alternately. It should be noted that not only the stripe-shaped wells are held in contact with the power supply line in the periphery of the display region but there are provided fine power supply lines in the display region for ensuring a contact with the stripe-shaped wells.

It should be noted here that the stability of the resistance of the wells is very important for the operation of the display apparatus. Therefore, in this example, the contact area or the number of contacts of the n-wells within the display region is made greater than its counterpart of the p-wells. Since the p-wells are held to a constant potential on the p-type substrate, the substrate plays an important role as a low resistance body. Thus, while the performance of the n-wells arranged like islands may be fluctuated seriously by input and output signals of the sources and drains, such fluctuations are prevented by increasing the number of contacts with the upper wiring layer to ensure high quality images to be displayed on the screen of the liquid crystal panel.

Video signals (including ordinary video signals and pulse-modulated digital signals) are applied to the video signal input terminal 31 to turn on and off the signal transfer switches 27, which output them to the data lines according to the pulse from the horizontal shift register. The vertical shift register 22 applies a high pulse to the gates of the n-channel MOSFETs 23 of the selected row and a low pulse to the gates of the p-channel MOSFETs 24 of that row.

As described above, the switches of the pixel section are constituted by monocrystalline CMOS transmission gates that have an advantage that the signal to be written on the pixel electrodes does not rely on the threshold value of the MOSFETs so that source signals can be written without restrictions.

Additionally, since the switches are formed by monocrystalline transistors, they do not show any instability of operation on the boundary areas of the crystal grains of polysilicon TFTs (poly-Si TFTs) to realize a reliable and stable high speed drive operation.

Figure 5:
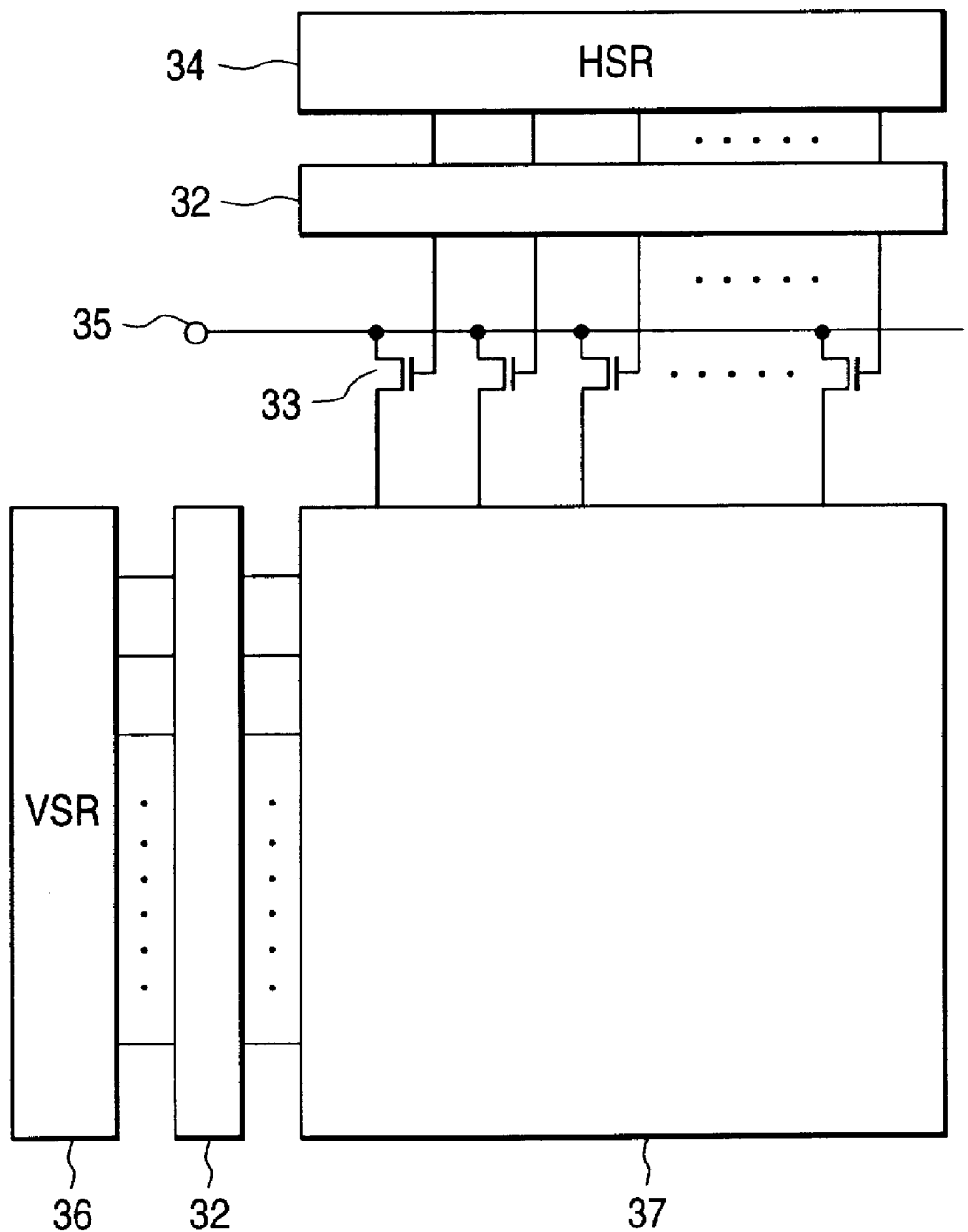
FIG. 5 is a schematic block diagram of a liquid crystal apparatus according to the invention.

Now, the peripheral circuits of the display panel will be described by referring to FIG. 5. FIG. 5 is a schematic block diagram of the peripheral circuits. In FIG. 5, there are shown a display area 37, a level shifter circuit 32, video signal sampling switches 33, horizontal shift register (HSR) 34, a video signal input terminal 35 and a vertical shift register (VSR) 36.

With the above circuit arrangement, the logic circuits including the horizontal and vertical shift registers can be driven with a low voltage of 1.5 to 5V to realize a quick and low voltage operation regardless of the video signal amplitude. Both the horizontal and vertical shift registers (HSR, VSR) can be scanned in opposite directions by means of a selection switch so that the panel does not need any alterations to make itself adapted to the positional arrangement of the optical system and hence to different products to a great advantage of the panel particularly in terms of the manufacturing cost of such products. While the video signal sampling switches 33 in FIG. 5 comprise unipolar transistors, they may alternatively comprise different devices to write an input video signal to all the signal lines by means of CMOS transmission gates.

When CMOS transmission gates are used, their operation may be fluctuated by video signals depending on the area of the NMOS gates and that of the PMOS gates as well as on the difference between the overlap capacitance of the gates and that of the source/drain regions. However, this problem can be prevented and a video signal can be written on the signal lines by connecting the sources and the drains of MOSFETs having a gate length equal to a half of that of the MOSFETs of the sampling switches 33 of the corresponding polarities to the respective signal lines and applying a pulse with the opposite phase. With this arrangement, images of higher quality can be displayed on the screen of the display panel.

Figure 6:
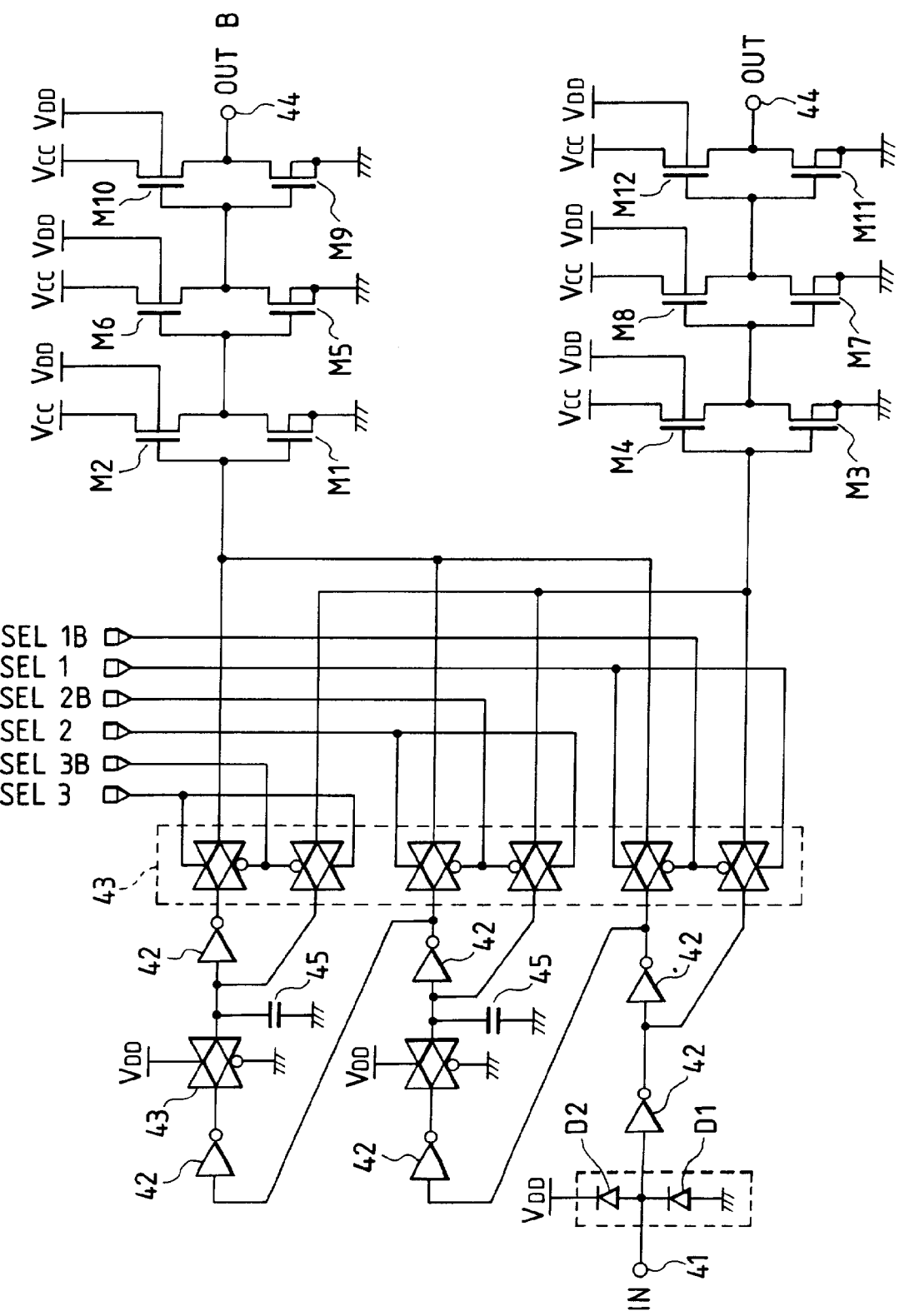
FIG. 6 is a circuit diagram of the input section of a liquid crystal apparatus according to the invention, including a delay circuit.

Now, a method for accurately synchronizing a video signal and a sampling pulse will be described by referring to FIG. 6. To achieve this objective, the delay amount of the sampling pulse have to be varied. Referring to FIG. 6, there are shown pulse delaying inverters 42, switches 43 for selecting one of the pulse delaying inverters, output terminals 44 for an output with a controlled delay amount (OUT B representing an opposite phase output and OUT representing an in-phase output), capacitances 45 and a protection circuit 46.

By a combined use of any of SEL1 (SEL1B: SEL1B being an inverted signal of SEL1) through SEL3 (SEL3B: SEL3B being an inverted signal of SEL3), a sampling pulse can be made to pass through a selected number of delaying inverters 42.

Due to the synchronous circuit built in the display panel, if the symmetry of an externally applied pulse is damaged for some reason attributable to jigs in terms of delay amount for the three panels of red, green and blue of the display panel, the symmetry can be recovered by means of said selection switches to display clear images that are free from color breakups of red, blue and green due to phase shifts of the pulse in a high frequency band. Alternatively, the delay amount can be regulated by means of temperature correction using the temperature measured by a built-in diode and a stored reference table.

Now, the liquid crystal panel of liquid crystal display apparatus according to the invention will be described in terms of the components and the liquid crystal substance. The opposite substrate 16 shown in FIG. 3 is flat, but it is made to show undulations in order to prevent reflections at the interface with the common transparent electrode 15 arranged on a surface of the opposite substrate 16. The opposite substrate 16 is provided on the opposite surface thereof with an anti-reflection film 20. These components may be made to show undulated profiles by polishing them with fine sands in order to improve the contrast of the displayed images.

Polymer network liquid crystal PNLC is used for the liquid crystal of this panel, although polymer dispersion liquid crystal PDLC may alternatively be used as polymer network liquid crystal. Polymer network liquid crystal PNLC can be produced by means of a polymerization phase separation technique, where a solution of liquid crystal and a polymeric monomer or oligomer is prepared and injected into a cell with a known technique and then the liquid crystal and the polymer are phase-separated by means of UV polymerization to form a polymer network in the liquid crystal. PNLC contains liquid crystal to a large extent (70 to 90 wt %).

Scattering of light can be increased in PNLC when nematic liquid crystal having a highly anisotropic refractivity ($\Delta$n) is used for it. A low voltage drive is made possible by the use of nematic liquid crystal having a dielectrically highly anisotropic property ($\Delta\epsilon$). Scattering of light can be made strong enough for achieving a sharp contrast for the display of images when the size of the polymer network expressed in terms of the distance between the centers of adjacent meshes is between 1 and 1.5 ($\mu$m).

Figure 7:
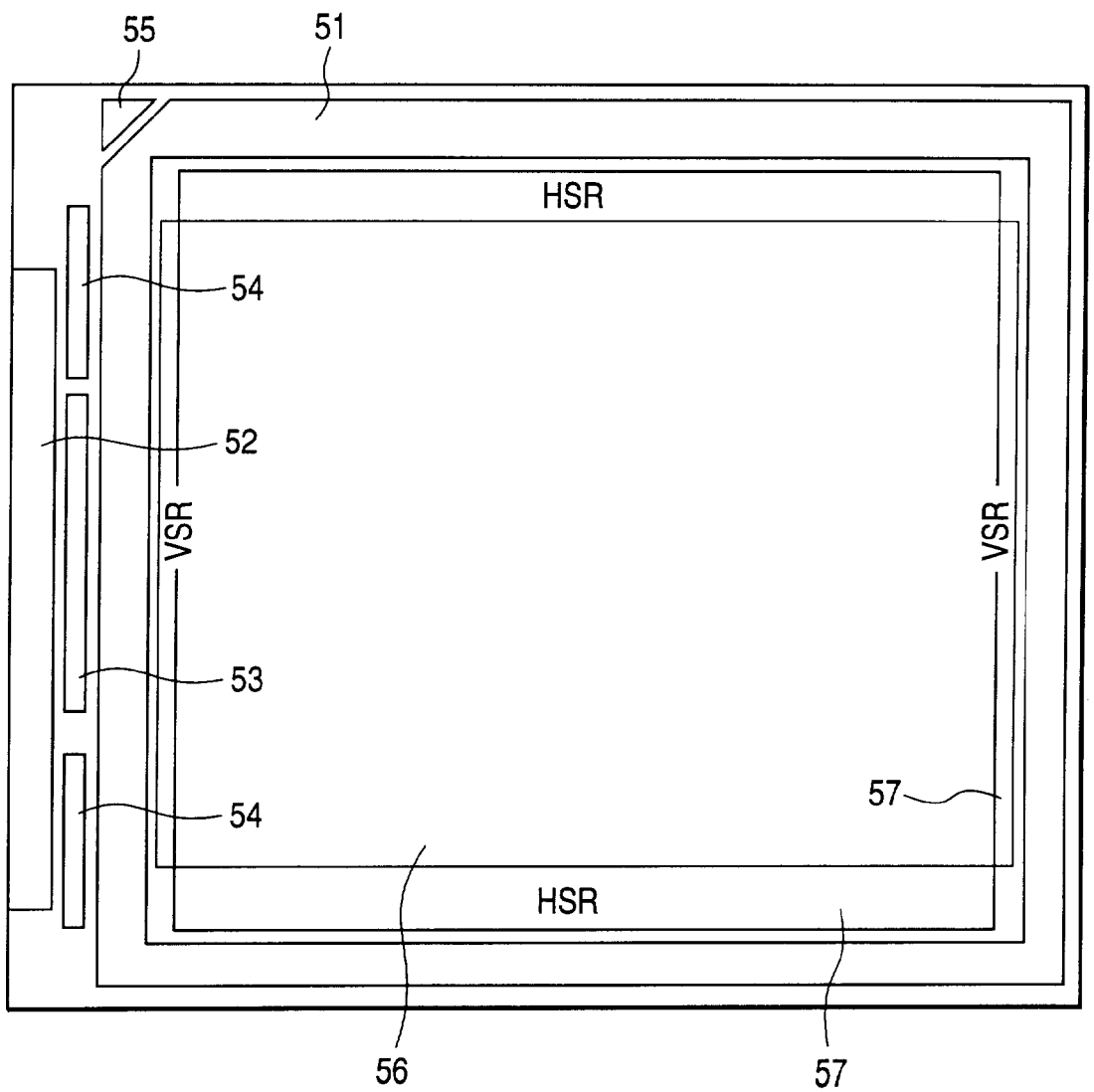
FIG. 7 is a schematic plan view of the liquid crystal panel of a liquid crystal apparatus according to the invention.

Now, the relationship between the sealing arrangement and the configuration of the panel will be described by referring to FIG. 7. In FIG. 7, there are shown a sealing member 51, an electrode pad unit 52, a clock buffer circuit 53 and an amplifier 54, which amplifier operates as an output buffer to be used for an electric test of the panel. Otherwise, there are also shown an Ag paste sections 55 that show an electric potential same as that of the opposite substrate, a display section 56 and a peripheral circuit section 57 typically comprising SR (shift registers) and other devices. As seen from FIG. 7, circuits are arranged both inside and outside of the seal in order to reduce the overall chip size. While all the pads that are arranged on a lateral side of the panel, they may alternatively be arranged on the top or bottom side of the panel or on two or more than two sides of the panel for handling a high speed clock efficiently.

When preparing an liquid crystal apparatus by using an Si substrate, the electric potential of the substrate can fluctuate to give rise to operational failures of the panel if a strong beam of light emitted from a projector strikes one or more than one lateral walls of the substrate. Therefore, it is highly desirable that the peripheral circuit sections at the top and the lateral sides of the panel are realized in the form of substrate holders that can shield light. Additionally, the Si substrate is preferably provided on the rear surface thereof with a plate of a metal having a high thermal conductivity such as Cu that is adhered to the substrate by means of an adhesive agent also having a high thermal conductivity, the metal plate operating as a holder.

Figure 9:
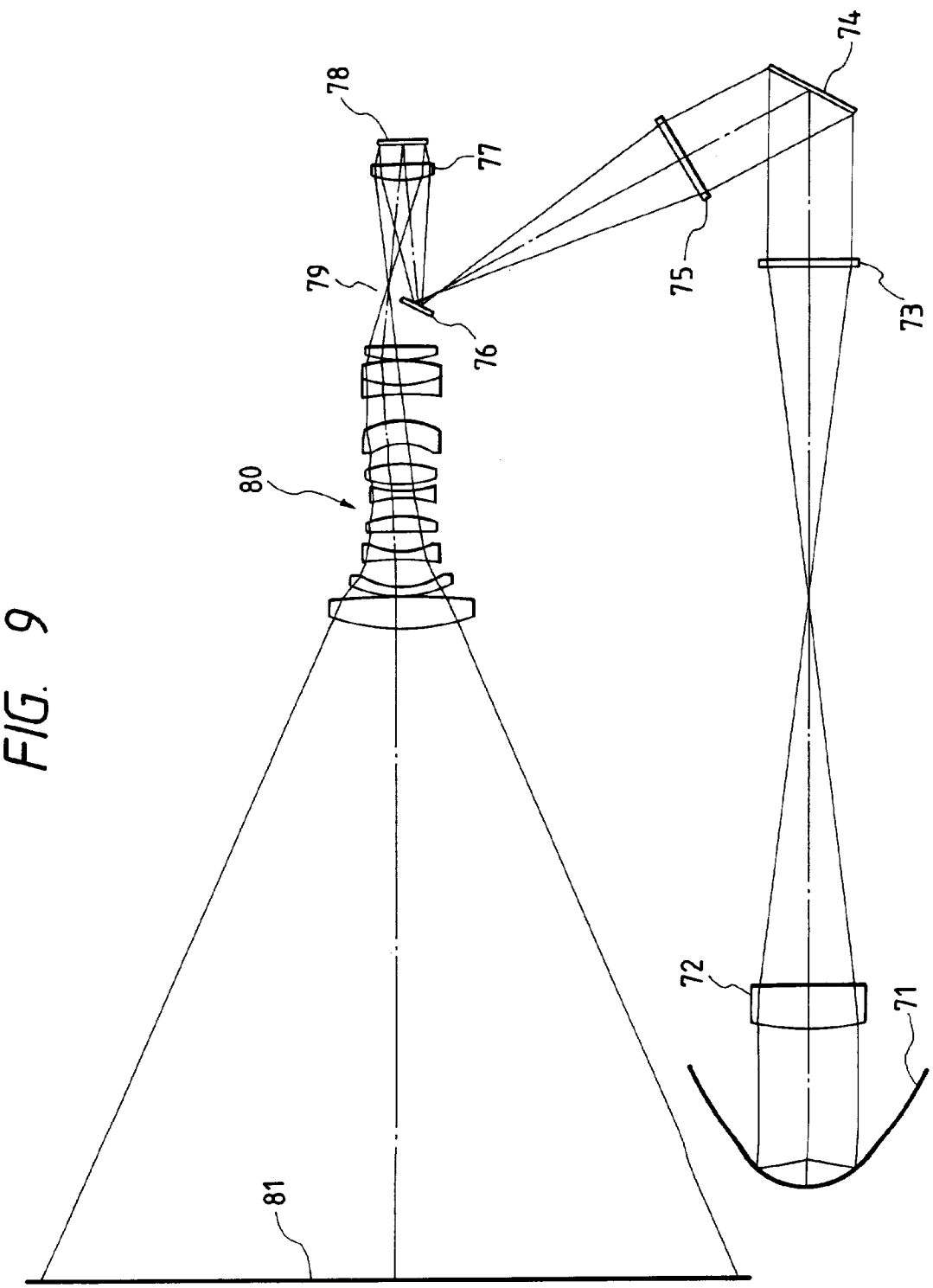
FIG. 9 is a schematic illustration of a liquid crystal projector comprising a liquid crystal apparatus according to the invention.

Now, an optical system that can be used in a reflection type liquid crystal panel according to the invention will be described by referring to FIG. 9. In FIG. 9, there are shown a light source 71 such as a halogen lamp, a focusing lens 72 for producing a focused image of the light source, convex Fresnel lenses 73 and 75 having a plane surface and a color separation optical device 74 which is preferably a dichroic mirror or a diffraction grating.

The optical system further comprises a mirror 76 for leading the separated red, green and blue beams of light to respective R, G and B panels, a view lens 77 for illuminating the panel with parallel rays of light obtained by collimating focused beams, a reflection type liquid crystal apparatus 78 and an iris (not shown) located at position 79. Reference numeral 80 denotes a projection lens and reference numeral 81 denotes a screen typically or a double-layered structure comprising a Fresnel lens for collimating projected light and a lenticular lens for expanding the viewing angle vertically and horizontally. While only a single panel of single color is shown in FIG. 9 for simplicity, a total of three panels of three primary colors are actually provided, although it may be appreciated that a single panel arrangement may feasibly be used in place of the three panels when a micro lens array is formed on the surface of the reflection panel to cause different incident rays of light to strike respective pixel regions. As a voltage is applied to the liquid crystal layer of the liquid crystal apparatus 78, incident light is regularly reflected by the pixels and then passes the iris located at position 79 before it is projected onto the screen.

On the other hand, incident light striking the reflection type liquid crystal apparatus 78 when no voltage is being applied to the liquid crystal layer and the latter is in a scattered state will be isotropically scattered and hence no light will strike the injection lens 80 except scattered rays of light that are directed toward the aperture of the iris located at position 79 so that consequently the display screen remains evenly dark. As will be appreciated from the above description of the optical system, since no polarizing panel is required for it and the signal light is reflected by the entire surface of the pixel electrode having a high reflectivity before it strikes the projection lens, the display panel can provide a degree of brightness that is twice to three times higher than that of any known comparable display panel. The noise component of light is minimized and a high contract display capability is provided since anti-reflection measure is taken on the surface of the opposite substrate and the interface thereof in this example. Additionally, all the optical devices (lenses, mirrors and so on) can be downsized to reduce the manufacturing cost and the weight of the display apparatus because the panel is adapted to dimensional reduction.

Any unevenness or fluctuations in the colors and the brightness on the display screen due to the unevenness or fluctuations in the colors and the brightness of the light source can be eliminated by inserting a (fly eye lens type or rod type) integrator between the light source and the optical system.

The electrodes 12 in the peripheral areas are not electrically secured and held in a floating state. When the drive voltage of the liquid crystal is 27V, the electric potential of the light shielding layer 7 is held to 13.5V, or a half of the drive voltage. Thus, it may be held to an appropriate electric potential, although it is dependent on the drive voltage of the liquid crystal.

Figure 10:
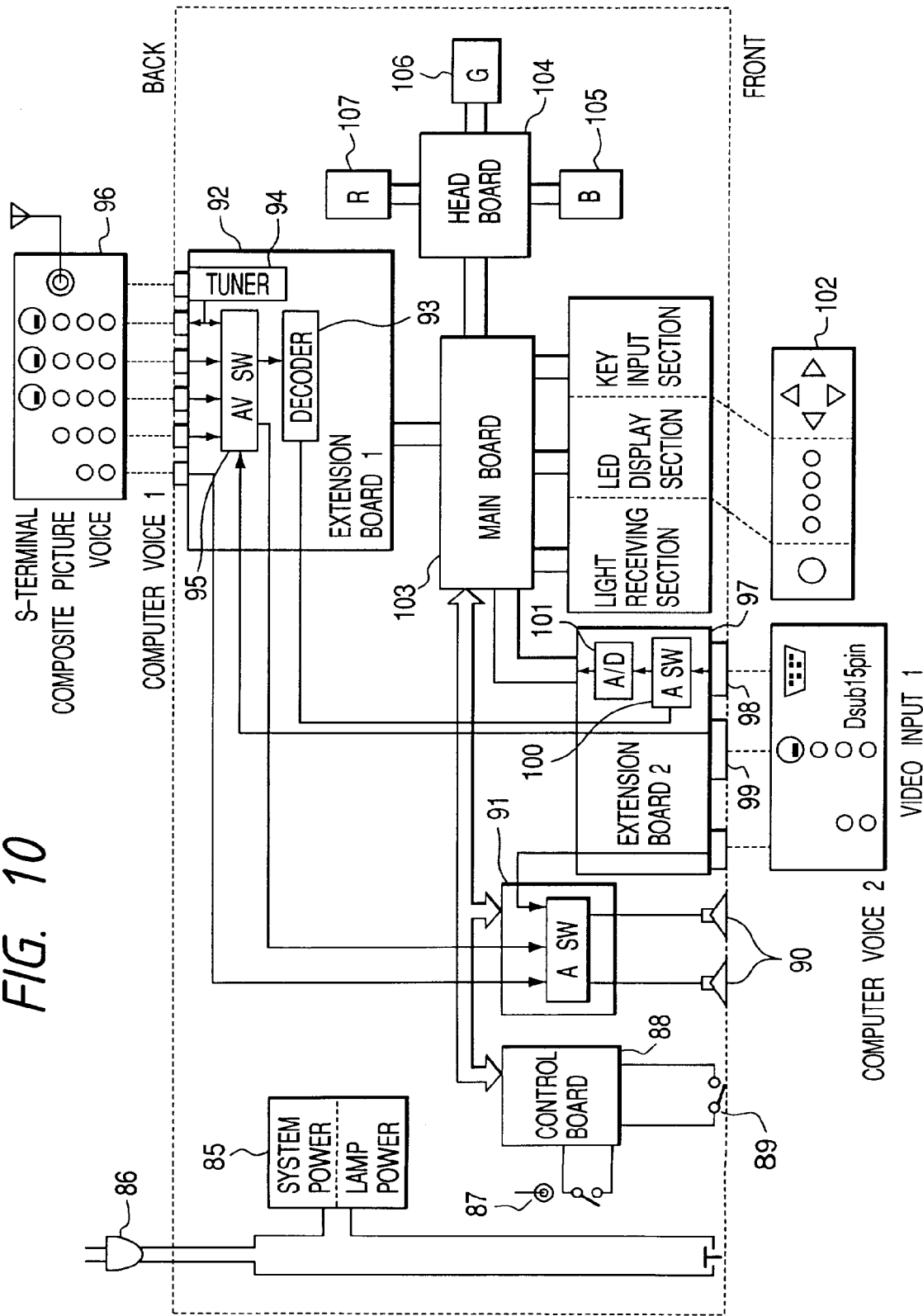
FIG. 10 is a schematic block diagram of the circuits arranged within a liquid crystal projector comprising a liquid crystal apparatus according to the invention.

FIG. 10 is a schematic block diagram of the peripheral electric circuits other than the panel. In FIG. 10, there are shown a power source unit 85 that comprises a power source for lamps and a system power source for driving the panel and the signal processing circuits, a plug 86, a lamp temperature sensor 87 for detecting any abnormal temperature of any of the lamps, a control board 88 for deenergizing any lamps showing abnormal temperature, and a filter safety switch 89 for deenergizing any failed devices other than lamps. For example, an attempt for opening the high temperature lamp housing box of the apparatus will fail because of the safety measure provided to obstruct the attempt. Otherwise, there are also shown a speaker 90, an audio-board 91 that can be provided with a built-in processor for 3-D sound and surround sound effects, an extension board 92, or extension board 1, comprising input terminals connected to an external apparatus 96 for providing signals including those for S-terminals, composite pictures and voices, selection switches 95 for selecting one or more than one appropriate signals and a tuner 94. Signals are transmitted from the extension board 1 to extension board 2 by way of a decoder 93. The extension board 2 comprises Dsub 15 pin terminals connected to separate signal sources such as video recorders and/or computers and signals applied to it by way of a switch 100 are converted into digital signals by means of an A/D converter 101.

Reference numeral 103 denotes a main board comprising a memory and a CPU as principal components. NTSC signals that have been A/D converted are stored in the memory so that missing signals may be generated by interpolation in order to allocate them appropriately to a large number of pixels and signals may be subjected to processing operations suited for a liquid crystal apparatus including gamma transformation edge emphasis, brightness regulation and bias regulation. Besides NTSC signals, computer signals may be subjected to processing operations including resolution conversion if the panel is a high resolution XGA panel and VGA signals are provided. In addition to the operation of processing picture data, the main board operates for synthetically combining a plurality of picture data NTSC signals with computer signals. The output signal of the main board is subjected to a serial/parallel conversion to take a form that is less affected by noise before it is transmitted to a head board 104, where the signal is once again subjected to a parallel/serial conversion and then to a D/A conversion and written onto panels 105, 106 and 107 according to the number of video lines of the panels by way of an amplifier. Reference numeral 102 denotes a remote control panel that allows a computer display to be manipulated in a simple manner like a TV display.

Embodiment 2

Now, a so-called single panel type full color display apparatus comprising a liquid crystal apparatus (panel) that is provided with micro lenses will be described.

The applicant of the present patent application proposed a new display panel in Japanese Patent Application No. 9-72646 to solve the problem that the mosaic arrangement of R, G and B pixels is noticeable to the viewer to degrade the quality of the image displayed on the screen of known display panels that are provided with micro lenses. The display panel proposed in Japanese Patent Application No. 9-72646 comprises a pixel unit array obtained by arranging a set of pixel units at a predetermined pitch, each pixel unit comprising three pixels of a first color, a second color and a third color, in which the first color pixel and the second color pixel are arranged in a first direction and the first color pixel and the third color pixel are arranged in a second direction different from the first direction, so that the two pixels arranged in the first direction shares the pixel of the first color with the two pixels arranged in the second direction, and a plurality of micro lenses arranged on the pixel unit array on the substrate at a pitch corresponding to the pitch of pixel arrangement in the first direction and that of pixel arrangement in the second direction.

Now, a display panel proposed in the above cited Japanese Patent Application No. 9-72646 is applied to a liquid crystal apparatus and a display apparatus according to the invention.

Figure 12C:
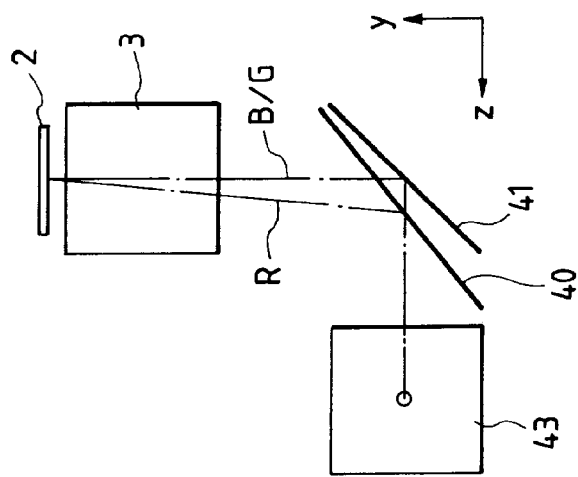
FIGS. 12A, 12B and 12C are schematic illustrations showing a projection type display apparatus according to the invention.
Figure 12A:
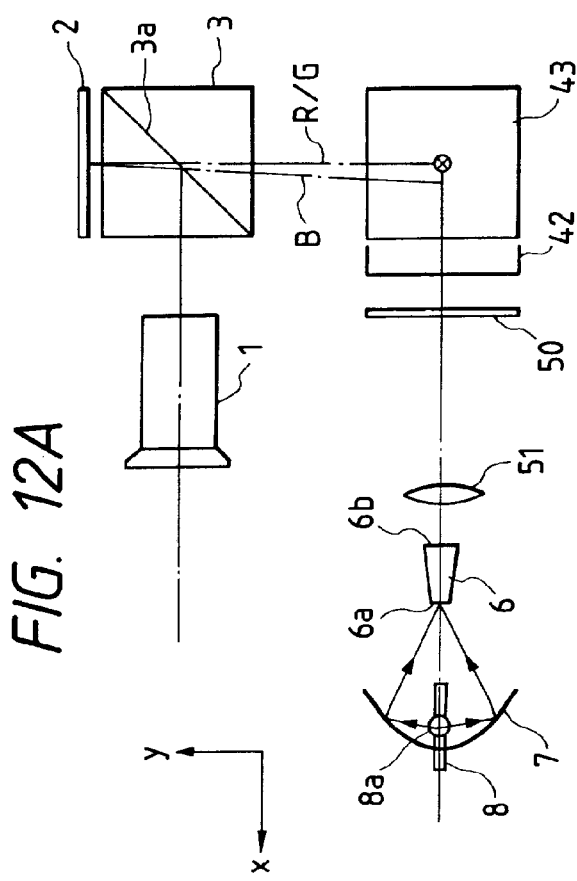
Figure 12B:
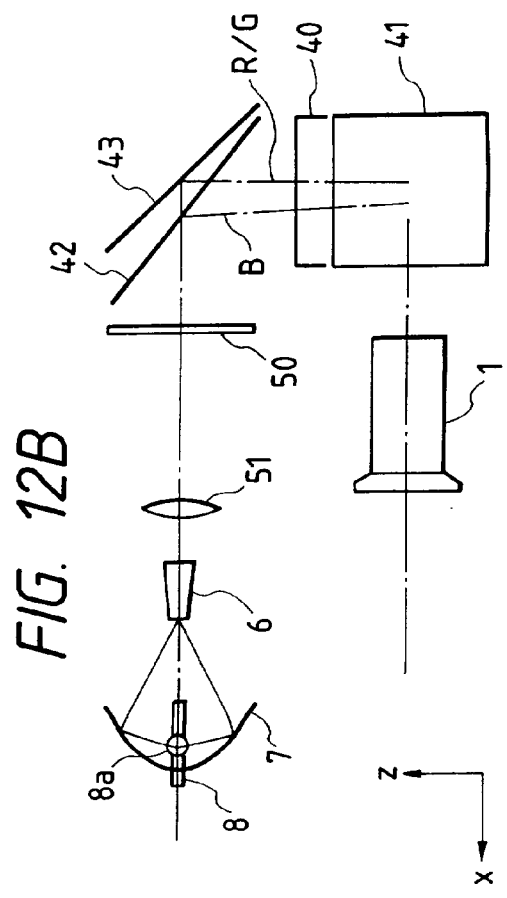

FIGS. 12A through 12C are schematic illustrations of the optical system of a projection type liquid crystal display apparatus comprising a display panel, showing only a principal area thereof. Note that FIG. 12A is a plan view, FIG. 12B is a front view and FIG. 12C is a side view.

Figure 13A:
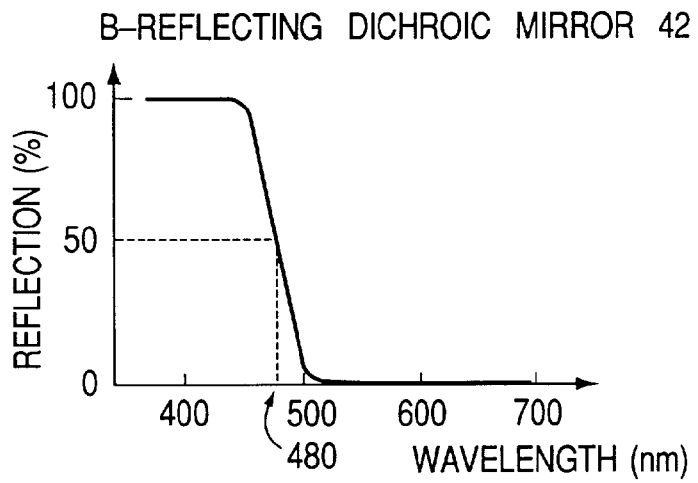
FIGS. 13A, 13B and 13C are graphs showing the spectral reflection characteristics of the dichroic mirrors that can be used in a projection type display apparatus according to the invention.
Figure 13B:
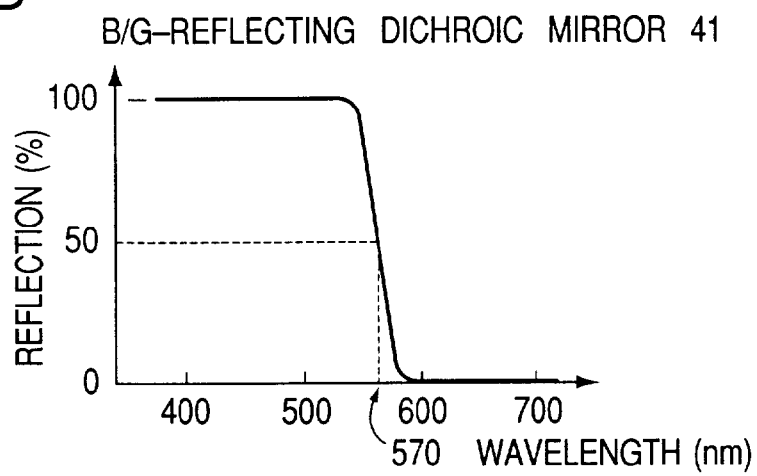
Figure 13C:
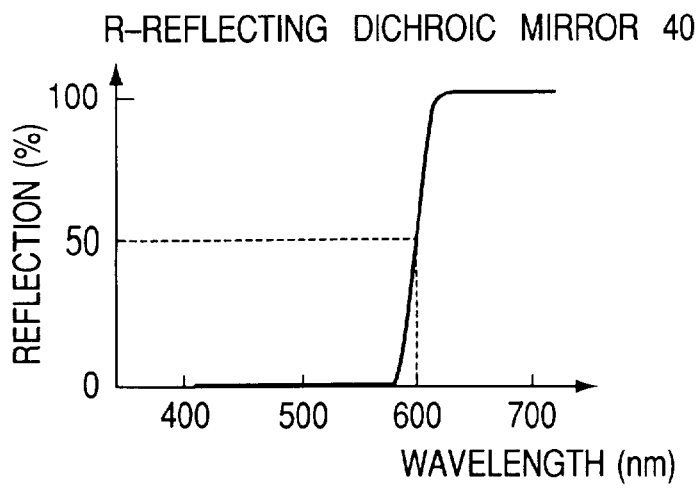
Figure 14:
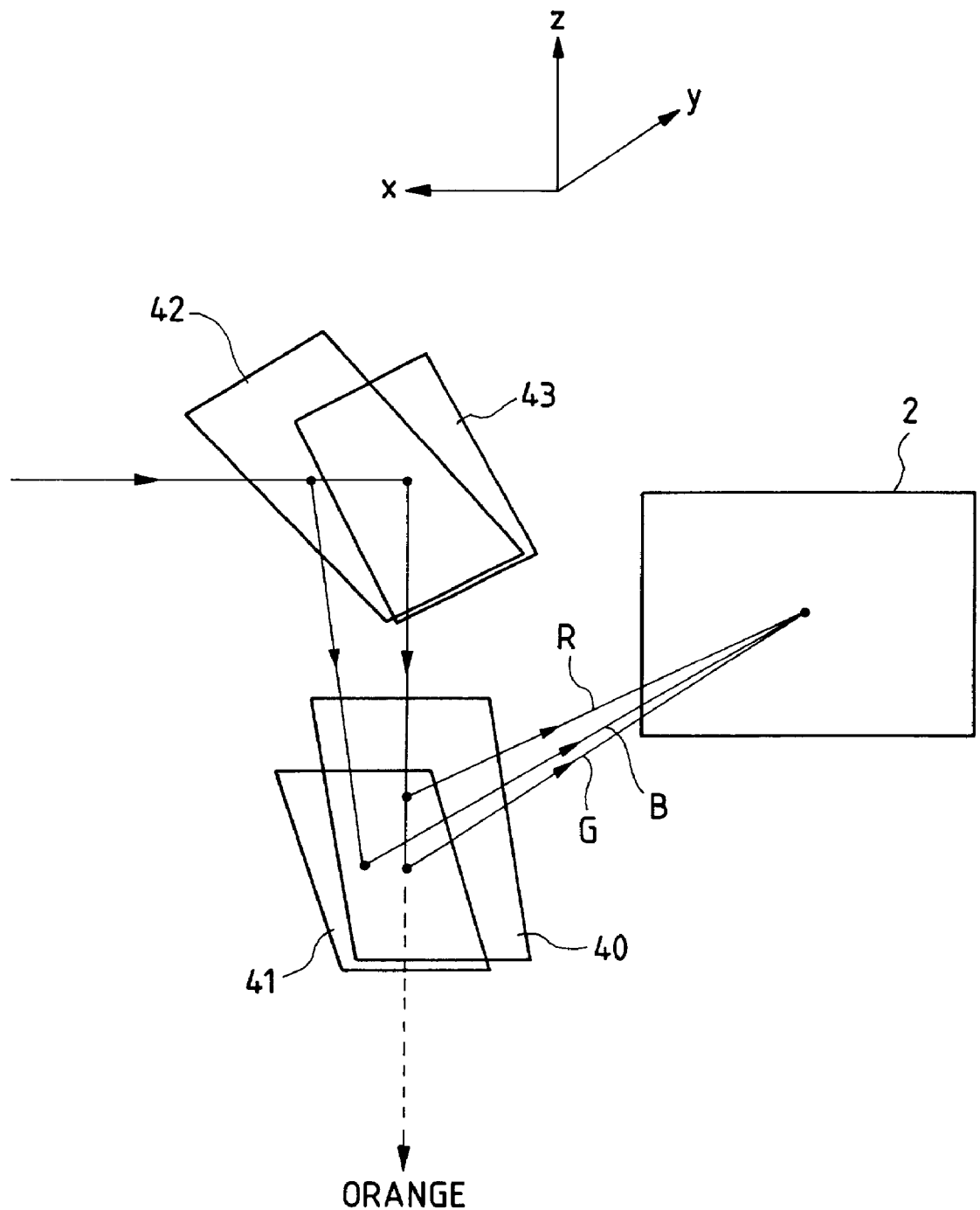
FIG. 14 is a schematic illustration of the color separation/illumination section of a projection type display apparatus according to the invention.

Referring to FIGS. 12A through 12C, the optical system comprises a projection lens 1 for projecting the pixel data displayed on display panel (liquid crystal panel) 2 that comprises a liquid crystal apparatus provided with micro lenses onto a predetermined plane, a polarized beam splitter (PBS) 3 typically designed to transmit S-polarized beams and reflect P-polarized beams, an R (red light) reflecting dichroic mirror 40, a B/G (blue and green light) reflecting dichroic mirror 41, a B (blue light) reflecting dichroic mirror 42, a high reflection mirror 43 for reflecting beams of all colors, a Fresnel lens 50, a concave lens (positive lens) 51, a rod type integrator 6, an elliptic reflector 7 and an arc lamp (light source) 8 such as a metal hallide or a UHP having its light emitting plane 8a located at the center of the reflector 7. The R (red light) reflecting dichroic mirror 40, the B/G (blue and green light) reflecting dichroic mirror 41, and the B (blue light) reflecting dichroic mirror 42 have spectral reflection characteristics as illustrated in FIGS. 13A, 13B and 13C respectively. The dichroic mirrors are arranged three-dimensionally with the high reflection mirror 43 as shown in FIG. 14 in order to divide the white illumination light from the power source 8 into three primary colors of R, G and B and illuminate the liquid crystal panel 2 with rays of light of three primary colors three-dimensionally from different respective directions as will be described in greater detail hereinafter.

The flux of light from the light source 8 proceeds in a manner as described below. Firstly, the white flux of light emitted from the lamp 8 is focused to the entrance (incident light striking plane) 6a of the integrator 6 by the elliptic reflector 7 arranged upstream relative to it and then passes through the integrator 6, while being repeatedly reflected in the latter, to obtain a uniform spatial intensity distribution. The flux of light coming out of the exit 6b of the integrator 6 is then transformed into a parallel flux running along the x-axis (as shown in FIG. 12B) by means of the concave lens 51 and the Fresnel lens 50 before it gets to the B reflecting dichroic mirror 42.

Only rays of B light (blue light) are reflected downward by the B-reflecting dichroic mirror 42 and directed toward the R-reflecting dichroic mirror 40 with a predetermined angle relative to the z-axis (as shown in FIG. 12B). Meanwhile, the remaining rays of light of red and green (R/G light) pass through the B-reflecting dichroic mirror 42 and reflected rectangularly by the high reflection mirror 43 into the direction of the z-axis and also directed toward the R-reflecting dichroic mirror 40.

Thus, both the B-reflecting dichroic mirror 42 and the high reflection mirror 43 are so arranged as to reflect the flux of light coming from the integrator 6 (along the x- axis) downwardly along the z-axis in FIG. 12B and the high reflection mirror 43 is inclined by 45° from the x-y plane around the y-axis, whereas the B-reflecting dichroic mirror 42 is inclined by an angle smaller than 45° from the x-y plane around the y-axis.

As a result, while the R/G rays of light reflected by the high reflection mirror 43 is directed toward the R- reflecting dichroic mirror 40 exactly along the z-axis, the B rays of light reflected by the B-reflecting dichroic mirror 42 is directed downwardly toward the R-reflecting dichroic mirror 40 along a path tilted by a predetermined angle relative to the z-axis (a tilt in the x-z plane) in FIG. 12B. The positional shift and the angular tilt of the B-reflecting dichroic mirror 42 from the high reflection mirror 43 are so determined as to make the rays of light of the three colors intersect each other on the liquid crystal panel 2 in order to cause both B light and R/G light to cover a same and identical area on the liquid crystal panel 2.

Then, the rays of R/G/B light directed downward (in the direction of z-axis) in FIG. 12B move toward the R-reflecting dichroic mirror 40 and the B/G-reflecting dichroic mirror 41, which mirrors are located below the B-reflecting dichroic mirror 42 and the high reflection mirror 43. More specifically, the B/G-reflecting dichroic mirror 41 is inclined by 45° relative to the x-z plane around the x-axis, whereas the R-reflecting dichroic mirror 40 is inclined by an angle smaller than 45° relative to the x-z plane around the x-axis.

Thus, of the incident rays of R/G/B light, only those of B/G light are transmitted through the R-reflecting dichroic mirror 40 and reflected rectangularly by the B/G-reflecting dichroic mirror 41 into the positive direction of the y-axis before they are polarized by the PBS 3 to illuminate the liquid crystal panel 2 arranged horizontally on the x-z plane.

As described above (see FIGS. 12A and 12B), since the rays of B light proceed with a predetermined angle (the tilt in the x-z plane) relative to the x-axis, they also maintain a predetermined angle (the tilt in the x-z plane) relative to the y-axis after being reflected by the B/G-reflecting dichroic mirror 41 and illuminate the liquid crystal panel 2 with an angle of incidence (along the x-y plane) equal to that angle. On the other hand, the rays of G light is reflected rectangularly by the B/G-reflecting dichroic mirror 41 into the positive direction of the y-axis before they are polarized by the PBS 3 to illuminate the liquid crystal panel 2 perpendicularly with an angle of incidence equal to 0°.

Meanwhile, the rays of R light is reflected by the R-reflecting dichroic mirror 40 arranged upstream relative to the B/G-reflecting dichroic mirror 41 into the positive direction of the y-axis in a manner as described, showing a predetermined angle relative to the y-axis (the tilt in the y-z plane) as illustrated in FIG. 12C, before they are polarized by the PBS 3 to illuminate the liquid crystal panel 2 with an angle of incidence (along the y-z plane) equal to that angle.

As described above, the positional shift and the angular tilt of the B/G-reflecting dichroic mirror 41 from the R-reflecting dichroic mirror 40 are so determined as to make the rays of light of the three colors of R, G and B intersect each other on the liquid crystal panel 2 in order to cause both R light and B/G light to cover a same and identical area on the liquid crystal panel 2.

As shown in FIGS. 13A through 13C, the cut-off wavelength of the B/G-reflecting dichroic mirror 41 is 570 nm and that of the R-reflecting dichroic mirror 40 is 600 nm so that the rays of orange light are discarded out of the optical path after transmitting through the B/G-reflecting dichroic mirror 41 to provide an optimal balance of colors.

As will be described hereinafter, the rays of R, G and B light are reflection/polarization modulated by the liquid crystal panel 2 and reflected back to the PBS 3, which by turn reflects them into the positive direction of the x-axis by means of the PBS surface 3a and causes them to strike the projection lens 1. The projection lens 1 enlarges the image displayed on the liquid crystal panel 2 before it projects the image on the screen (not shown).

Since the rays of R, G and B light strike the liquid crystal panel 2 with respective angles of incidence that are different from each other, the reflected rays of R, G and B light also shows different angles. Therefore, the projection lens 1 is required to have a large diameter and a large aperture in order to take in all of them without missing any portion thereof. It should be noted that any angle of inclination of the flux of light striking the projection lens 1 is corrected as light of primary colors is collimated after passing through the micro lenses twice to maintain the angle of incidence at the liquid crystal panel 2.

Figures 24, 25:
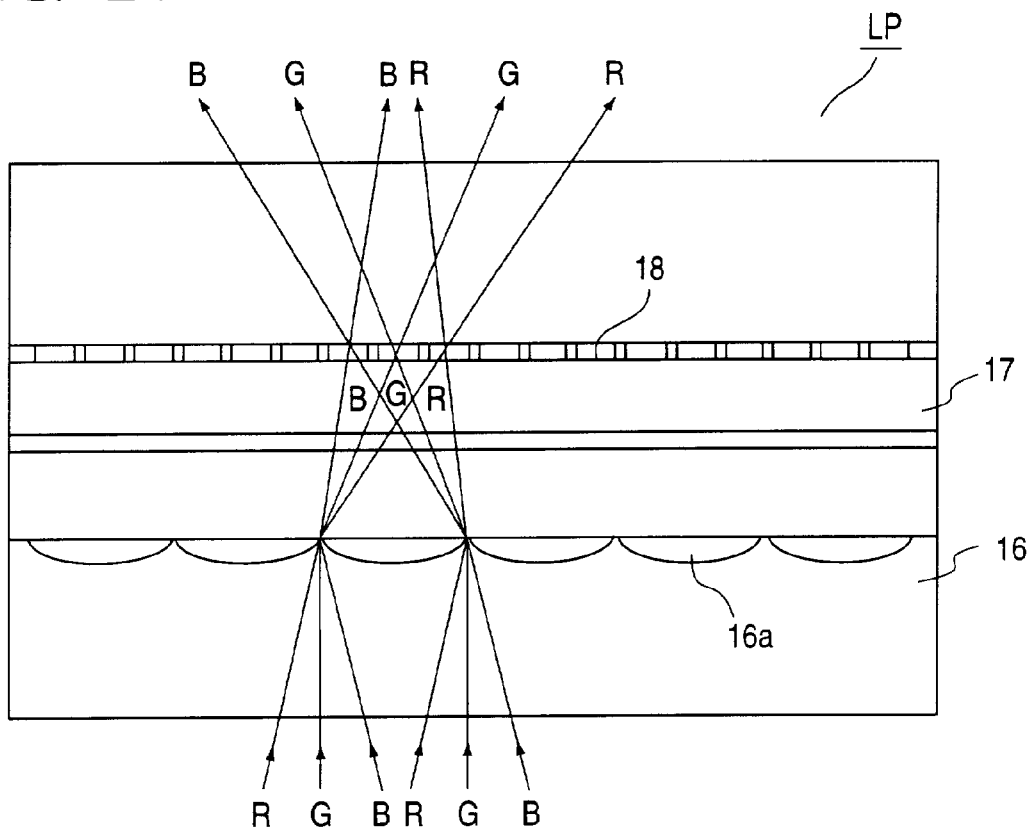
FIG. 24 is an enlarged schematic partial cross sectional side view of a known transmission type liquid crystal panel comprising micro lenses.
FIG. 25 is an enlarged schematic partial view of a projected image obtained by a known projection type display apparatus realized by using a transmission type liquid crystal panel comprising micro lenses.
Figure 26A:
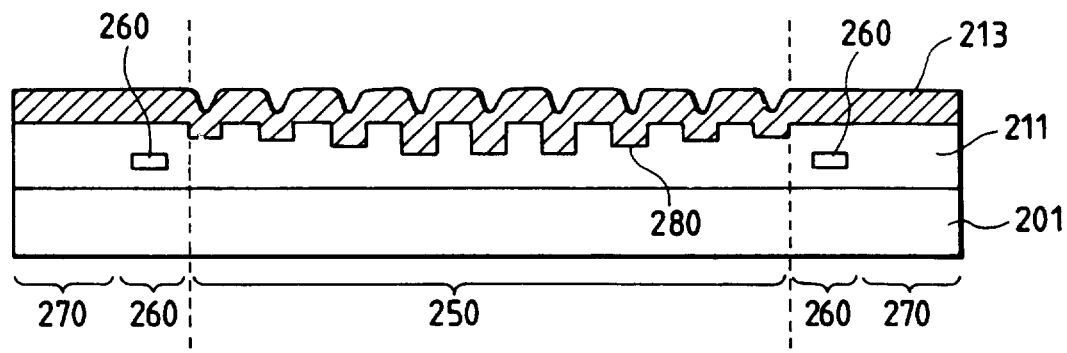
FIGS. 26A and 26B are schematic cross sectional views of a liquid crystal apparatus according to a preceding patent application filed by the applicant of the present patent application and illustrating different manufacturing steps.
Figure 26B:
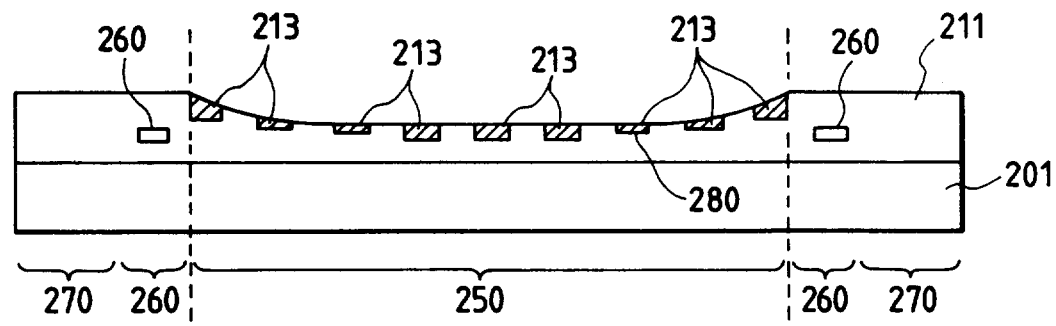
Figure 27A:
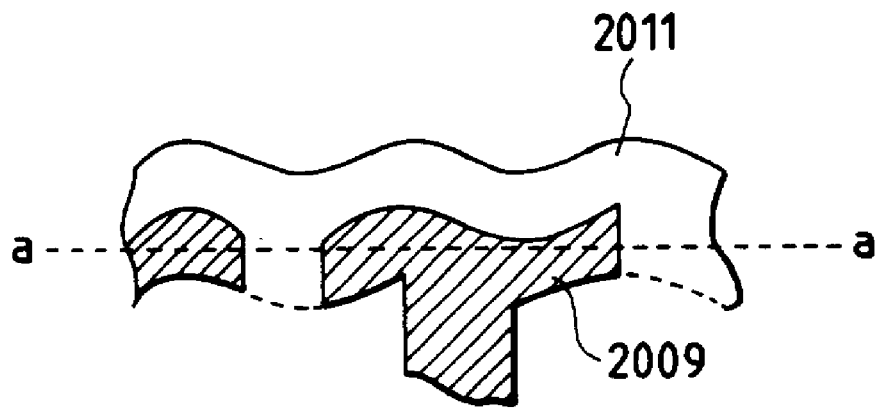
FIGS. 27A and 27B are schematic partial cross sectional views of a known liquid crystal apparatus, illustrating different manufacturing steps.
Figure 27B:
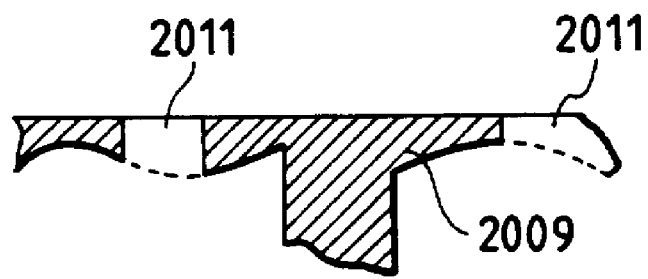
Figure 28A:
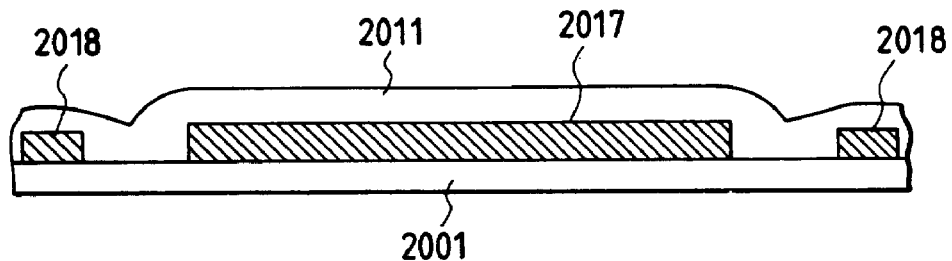
FIGS. 28A, 28B, 28C and 28D are schematic cross sectional views of another known liquid crystal apparatus, illustrating different manufacturing steps.
Figure 28B:
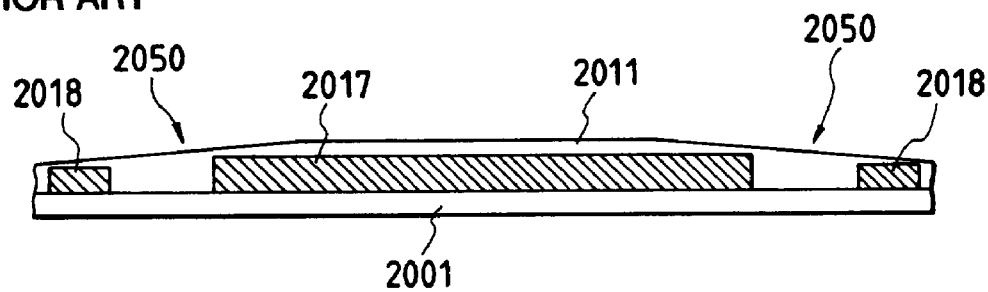
Figure 28C:
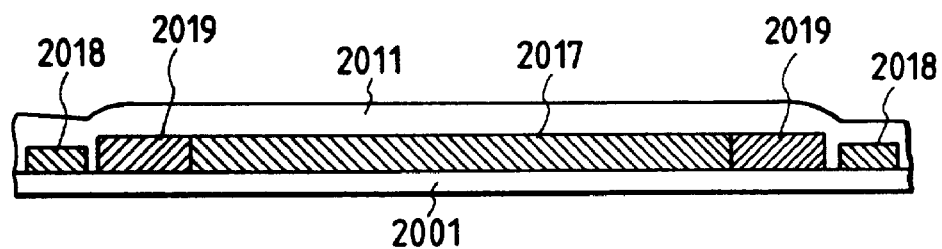
Figure 28D:
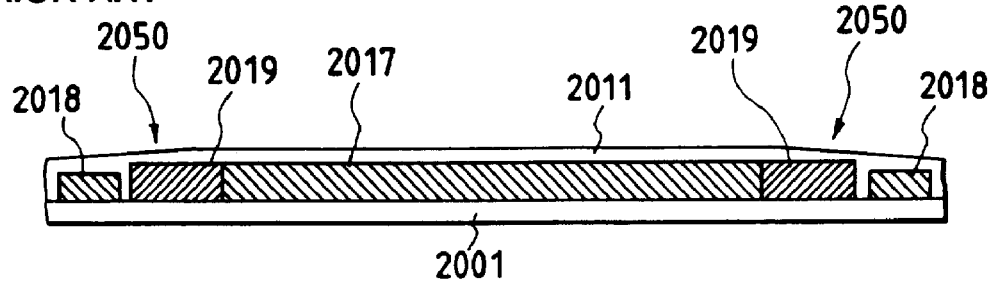

On the other hand, with a known transmission type liquid crystal panel LP illustrated in FIG. 24, the flux of light leaving the liquid crystal panel LP is spread out partly due to the focusing effect of the micro lens array 16 so that the projection lens is required to have a large numerical aperture and hence a large diameter to accommodate the spread out flux of light.

In FIG. 24, reference numeral 16 denotes a micro lens array obtained by arranging a number of micro lenses 16a at a predetermined pitch and reference numerals 13 and 18 respectively denote a liquid crystal layer and pixels of the three primary colors of R(red), G(green) and B(blue).

Rays of light of R, G and B are made to illuminate the liquid crystal panel LP with respective angles of incidence that are different from each other so that rays of light of different colors are received respectively by the pixels 18 of the corresponding colors due to the focusing effect of the micro lenses 16a. This arrangement makes the use of color filters unnecessary and provides a display panel that exploits light highly efficiently. Thus, a projection type display apparatus provided with such a display panel can display clear and bright color images if it comprises a single liquid crystal panel.

However, a known projection type display apparatus comprising a display panel that is provided with a micro lens array as described above has a drawback that the pixels 18 of the three primary colors of R, G and B are enlarged and projected on the screen with the image being displayed there to make the mosaic arrangement of the R, G and B pixels clearly visible to the viewer (as shown in FIG. 25) to degrade the quality of the image displayed on the screen.

Contrary to this, the flux of light coming from the liquid crystal panel 2 of this example shows only a relatively limited spread so that a clear and bright image can be projected onto the screen by means of a projection lens having a relatively small numerical aperture. Such a projection lens will naturally show small dimensions and the mosaic arrangement of R, G and B pixels can be made by far less visible.

Now, the liquid crystal panel 2 of this example will be described further. FIG. 15 is an enlarged schematic sectional view of the liquid crystal panel 2 of this example.

Referring to FIG. 15, it comprises a micro lens substrate (glass substrate) 1, micro lenses 22, a sheet glass 23, a transparent opposite electrode 24, a liquid crystal layer 25, pixel electrodes 26, an active matrix drive circuit 27 and a silicon semiconductor substrate 28. The micro lenses 22 are formed on the surface of the glass substrate (alkali type glass) 21 by means of an ion exchange method at a pitch twice as large as that of the pixel electrodes 26 to show a two-dimensional array, which is referred to as micro lens array.

The liquid crystal layer 25 is formed by ECB mode nematic liquid crystal such as DAP or HAN that is adapted to a reflection type display panel and held to an oriented state by means of an orientation layer (not shown). The pixel electrodes 26 are made of Al (aluminum) and designed to operate also as so many reflectors as they are subjected to a CMP process after a patterning operation in order to improve the surface condition and their reflectivity.

The active matrix drive circuit 27 is arranged on the silicon substrate 28 and comprises both a horizontal driver circuit and a vertical driver circuit. It is designed to write video signals of the three primary colors of R, G and B respectively on the R, G and B pixel electrodes 26. While the pixel electrodes 26 do not comprise any color filters, they are discriminated as R, G and B pixels by the video signals of the primary colors written by the active matrix drive circuit 27 so that they form an R, G, B pixel array as will be described hereinafter.

Firstly, G light will be described as part of light illuminating the liquid crystal panel 2. As described earlier, principal rays of G light are polarized by the PBS 3 before they strike the liquid crystal panel 2 perpendicularly. Note that only a ray of G light striking a micro lens 22a is shown in FIG. 15 by arrow G (in/out).

As shown, rays of G light striking the micro lens 22a are focused by the lens 22a and illuminate G pixel electrode 26g made of Al, which reflects them and drives them to pass through the same micro lens 22a and go out of the liquid crystal panel 2. As the rays of G light reciprocatingly move through the liquid crystal layer 25, they are modulated by the action of the liquid crystal caused by the electric field that is formed between the G pixel electrode 26g and the opposite electrode 24 as a signal voltage is applied thereto before the rays return to the PBS 3. The quantity of light reflected by the PBS surface 3a and directed toward the projection lens 1 varies depending on the extent of modulation so that an image with different densities of light and different gradations will be displayed by the pixels.

Rays of R light falling aslant along the y-z plane are polarized by the PBS 3 before they strike the micro lens 22b as indicated by arrow R (in) in FIG. 15. Then, they are focused by the micro lens 22b and illuminate R pixel electrode 26r located slightly left relative to the position right below the lens 22b, which pixel electrode 26r reflects them and drives them to pass through a neighboring micro lens 22a and go out of the liquid crystal panel 2 (R (out)).

The (polarized) rays of R light are also modulated by the action of the liquid crystal caused by the electric field that is formed between the R pixel electrode 26r and the opposite pixel electrode 24 as a signal voltage is applied thereto before they move out of the liquid crystal panel 2 and return to the PBS 3. Thereafter, they are projected onto the display screen as part of the image to be displayed there in a manner as described above by referring to the rays of G light.

While the rays of G light striking the G pixel electrode 26g and those of R light striking the R pixel electrode 26r may seem to interfere with each other in FIG. 15, it is simply because the liquid crystal layer 25 is disproportionally enlarged there in terms of its thickness. In actual terms, the liquid crystal layer 25 has a thickness of 5 $\mu$m at most, which is very small relative to the sheet glass 23 having a thickness between 50 and 100 $\mu$m and hence such interference does not take place regardless of the size of each pixel.

Figure 16A:
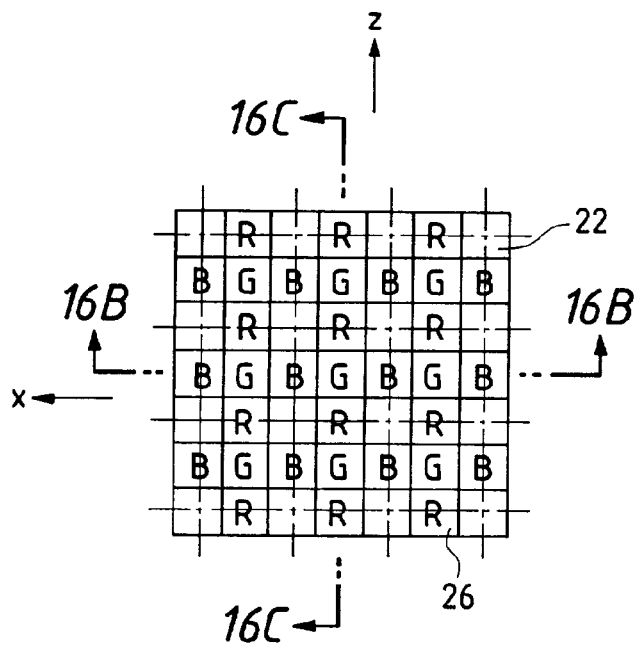
FIGS. 16A, 16B and 16C are illustrations showing the underlying principle of color separation and color synthesis for a liquid crystal panel according to the invention.
Figure 16C:
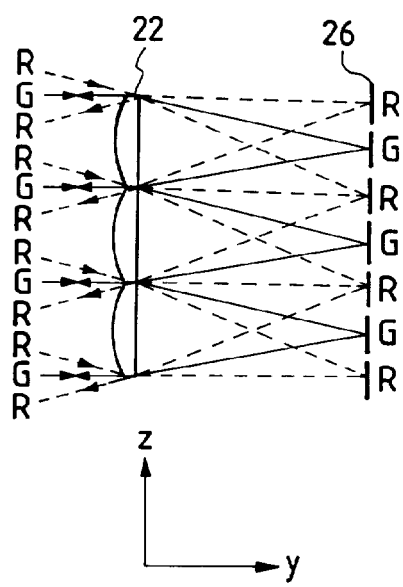
Figure 16B:
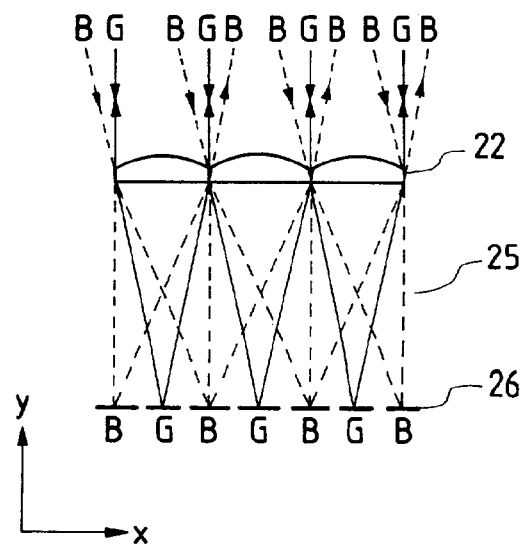

FIGS. 16A through 16C illustrate how color separation and color synthesis are carried out for the purpose of the invention. Note that FIG. 16A is a schematic plan view showing the upper surface of the liquid crystal panel 2 and FIGS. 16B and 16C are cross sectional views taken along line 16B—16B (the x-direction) and along line 16C—16C (z-direction) respectively.

It will be appreciated that FIG. 16C corresponds to FIG. 15 as they are taken along the y-z plane and show rays of G and R light entering and leaving the respective micro lenses 22. It will also be appreciated that the G pixel electrodes are located directly below the corresponding micro lenses 22 as primary pixel electrodes, whereas the R pixel electrodes are located directly below the respective boundaries of the micro lenses 22 as secondary pixel electrodes. Thus, the angle of incidence θ of R light is preferably so selected that tan θ is equal to the ratio of the pitch of pixel arrangement to the distance between the micro lens array 22 and the pixel electrode array 26.

On the other hand, FIG. 16B is a cross sectional view taken along the x-y plane of the liquid crystal panel. It will be seen that the B pixel electrodes that are ternary pixels are alternately arranged with the G pixel electrodes as in the case of FIG. 16C, wherein the G pixel electrodes are located directly below the corresponding micro lenses 22, whereas the B pixel electrodes are located directly below the respective boundaries of the micro lenses 22 as ternary pixels.

Since rays of B light illuminating the liquid crystal panel 2 strike the panel aslant (along the x-y plane) after they are polarized by the PBS 3 as described above, those coming from the micro lenses 22 are reflected by the respective B pixel electrodes and go out respectively from the adjacent micro lenses as viewed in the x-direction as shown in FIG. 16B. The mode of modulation of the liquid crystal layer 25 on the B pixel electrodes and the mode of projection of B light of the liquid crystal panel 2 are same as those described above in terms of G and R light.

The B pixel electrodes are located directly below the respective boundaries of the micro lenses 22 and, therefore, the angle of incidence θ of B light is preferably so selected that tan θ is equal to the ratio of the pitch of pixel arrangement (of the G and B pixels) to the distance between the micro lens array 22 and the pixel electrode array 26.

Thus, in the liquid crystal panel 2 of this example, the R, G and B pixels are arranged in the order of RGRGRG . . . along the z-direction (first direction) and in the order of BGBGBG . . . along the z-direction (second direction). FIG. 16A shows how they appear when viewed from above.

As described above, each of the pixels have a length equal to a half of that of each of the micro lenses 22 in either direction so that the pixels are arranged at a pitch equal to a half of the pitch of arrangement of the micro lenses 22 along the x- and z-directions. When viewed from above, it will be seen that the G pixels are located directly below the centers of the respective micro lenses 22, whereas the R pixels are located between the corresponding G pixels along the z-direction and directly below the respective boundaries of the micro lenses 22 and the B pixels are located between the corresponding G pixels along the x-direction and directly below the respective boundaries of the micro lenses 22. Each micro lens has a rectangular contour whose sides are twice as long as the corresponding sides of a pixel.

Figure 17:
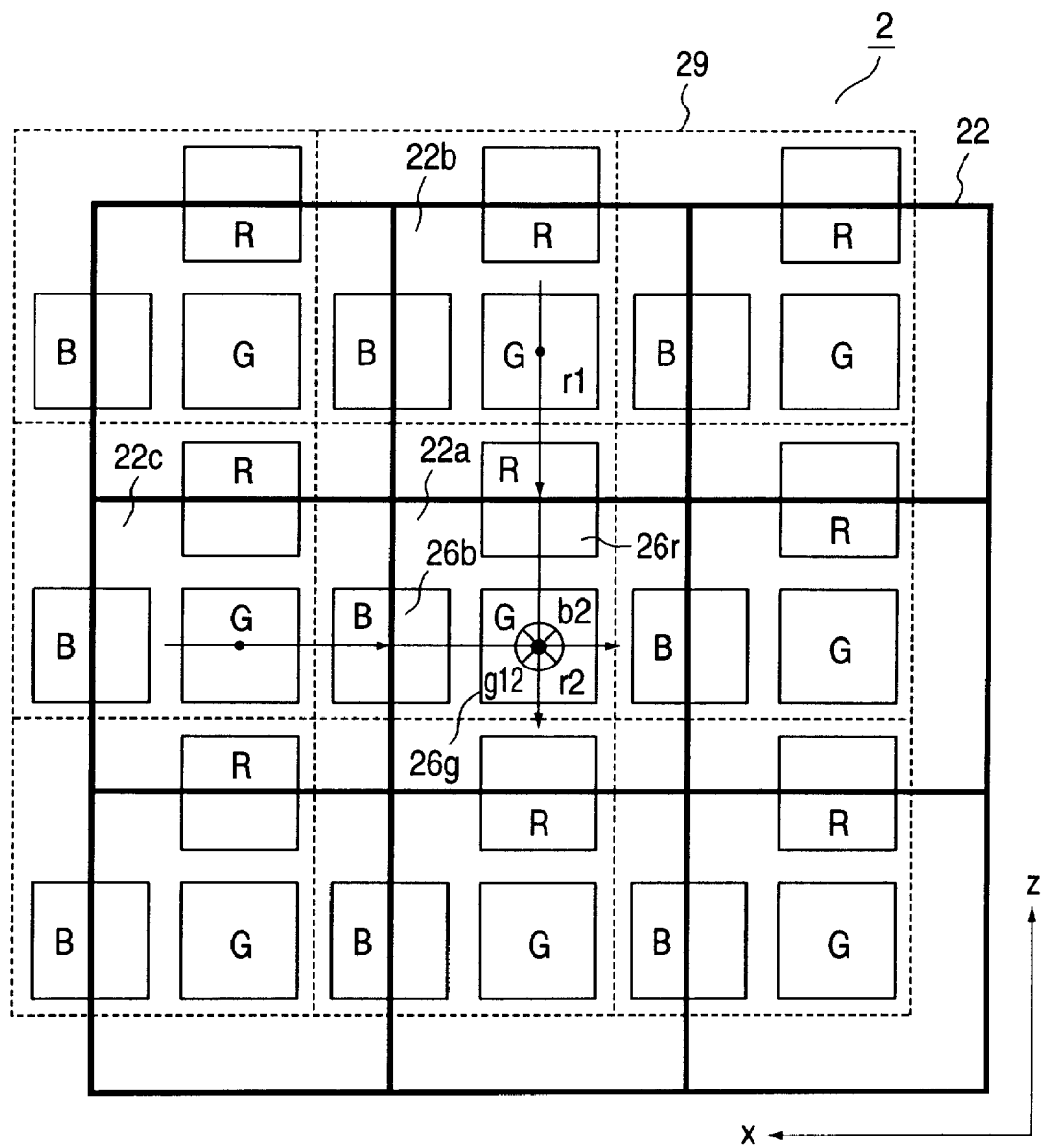
FIG. 17 is an enlarged schematic partial plan view of a liquid crystal panel according to the invention.

FIG. 17 is an enlarged schematic partial plan view of the liquid crystal panel 2. The lattice of broken lines in FIG. 17 define pixel units of R, G and B pixels for displaying images.

The pixel units are arranged two-dimensionally at a predetermined pitch on the substrate to produce a pixel unit array. In other words, when the R, G and B pixels are driven by the active matrix drive circuit 27 of FIG. 15, the R, G and B pixels of each pixel unit defined by the lattice of broken lines 29 are driven by respective R, G and B video signals that correspond to the location of the pixel unit.

Let us take a single pixel unit comprising a R pixel electrode 26r, a G pixel electrode 26g and a B pixel electrode 26b here. As indicated by arrow r1, the R pixel electrode 26r is illuminated by rays of R light coming aslant from the micro lens 22b, which rays of R light are then reflected to move out through the micro lens 22a as indicated by arrow r2. Similarly, the B pixel electrode 26b is illuminated by rays of B light coming aslant from the micro lens 22c as indicated by arrow b1, which rays of B light are then reflected to move out through the micro lens 22a as indicated by arrow b2.

On the other hand, the G pixel electrode 26g is illuminated by rays of G light coming perpendicularly from the micro lens 22a (relative to the FIG. 21) as indicated by arrow g12, which rays of G light are then reflected back to move out perpendicularly through the micro lens 22a.

Thus, with the liquid crystal panel 2 of this example, while rays of light of the primary colors strike each of the pixel units respectively with different angles of incidence, they leave the pixel unit by way of a same micro lens (micro lens 22a in the above described example).

Figure 18:
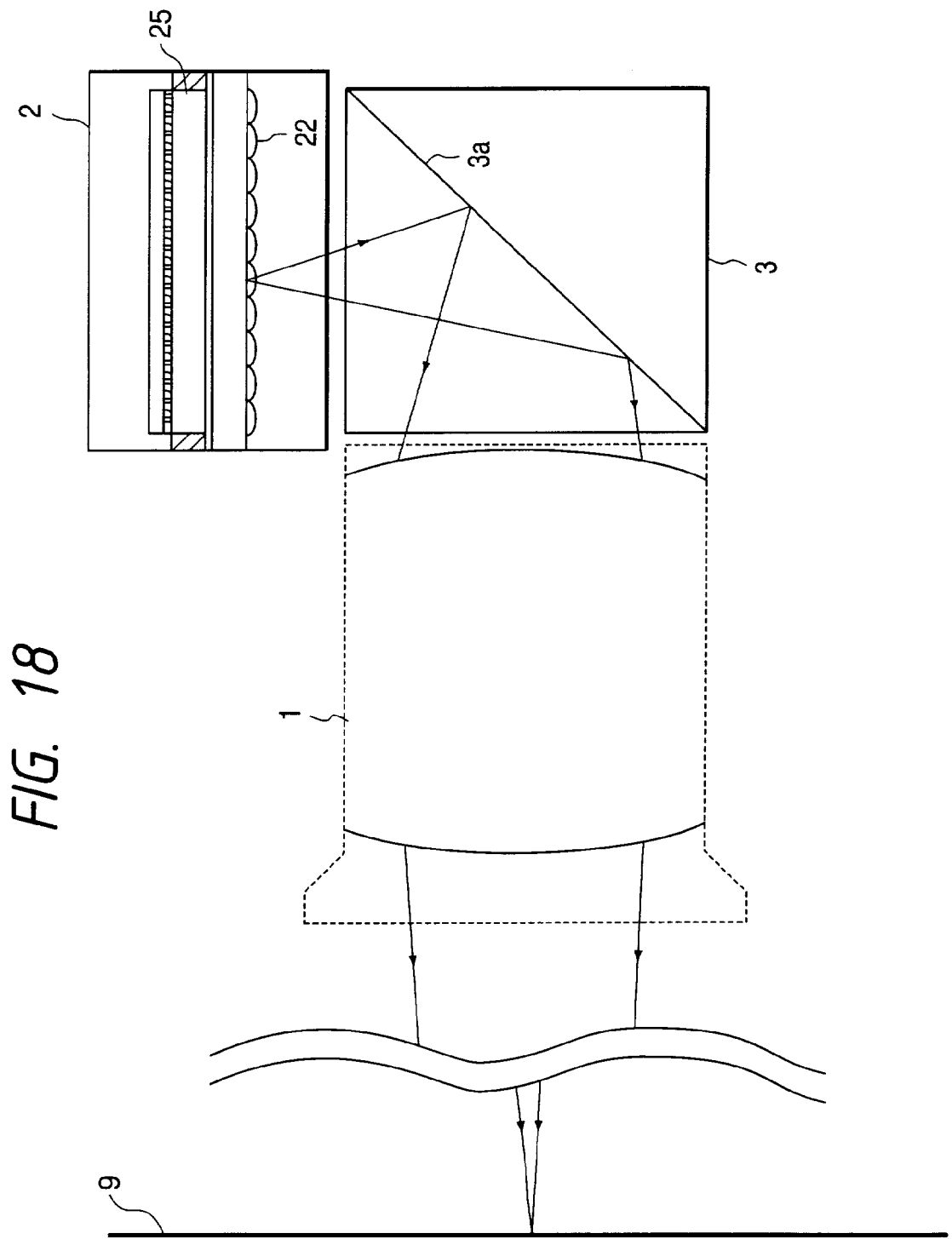
FIG. 18 is a schematic illustration of the projection optical system of a projection type display apparatus according to the invention.
Figure 22:
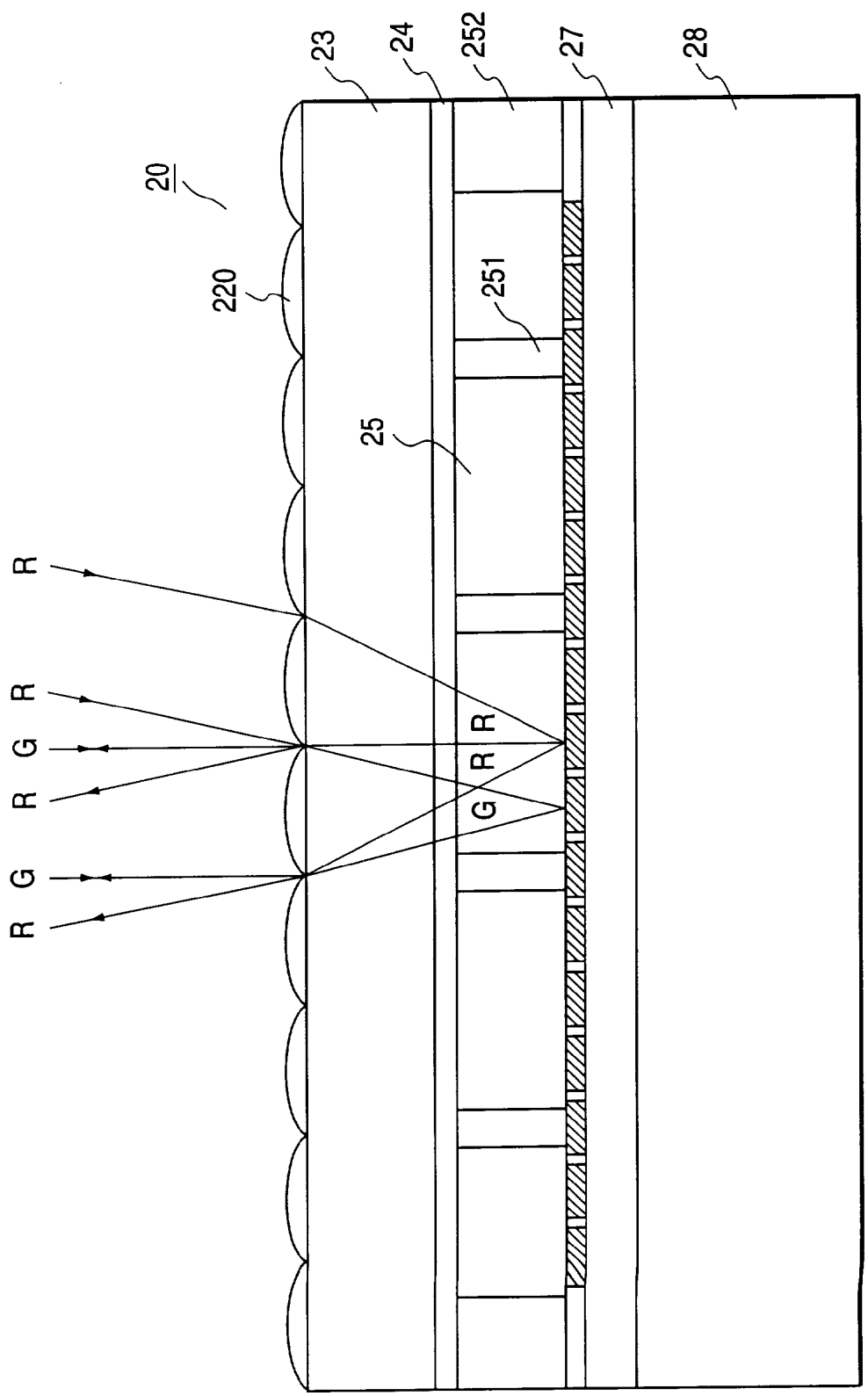
FIG. 22 is a schematic cross sectional view of a liquid crystal panel according to the invention.

FIG. 18 is a schematic illustration showing how all the rays of light coming from the liquid crystal panel 2 are projected onto the screen 9 by way of the PBS 3 and the projection lens 1. A liquid crystal panel 2 as illustrated in FIG. 17 is used here. When the optical system is so regulated that an image of the micro lenses 22 and/or a neighboring area in the liquid crystal panel 2 are focused and projected on the display screen 9, the rays of light emitted from the R, G and B pixels of each pixel unit are mixed with each other on the corresponding area of the lattice of the micro lenses 22 to reproduce the original colors as shown in FIG. 22.

In this example, a display panel as shown in FIG. 17 is used and the plane of the micro lenses 22 and/or a neighboring area provide a conjugated relationship with the display screen so that clear and bright color images may be displayed on the screen without showing the mosaic arrangement of R, G and B pixels.

Figure 19:
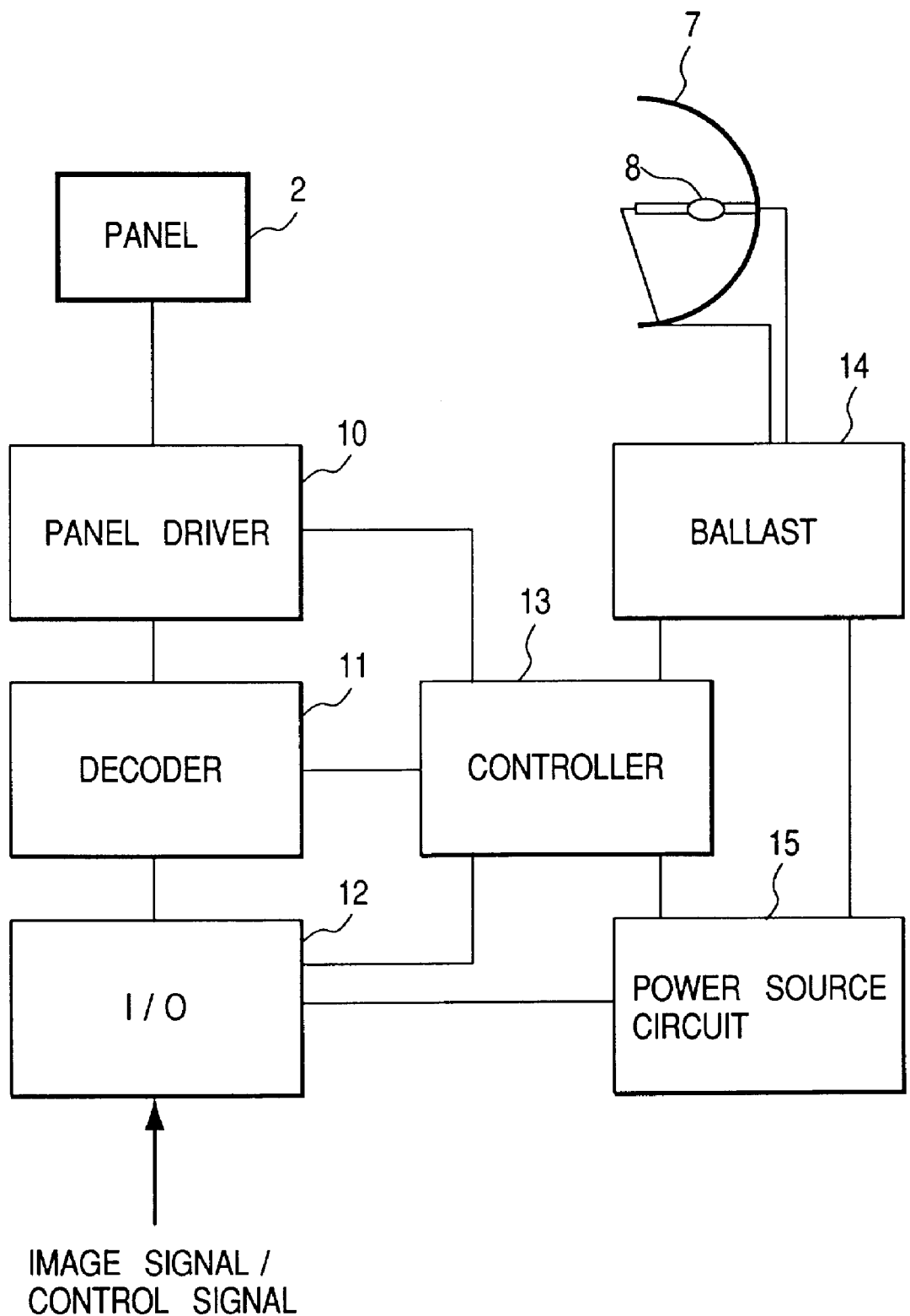
FIG. 19 is a schematic block diagram of the drive circuit system of a projection type display apparatus according to the invention.
Figure 20:
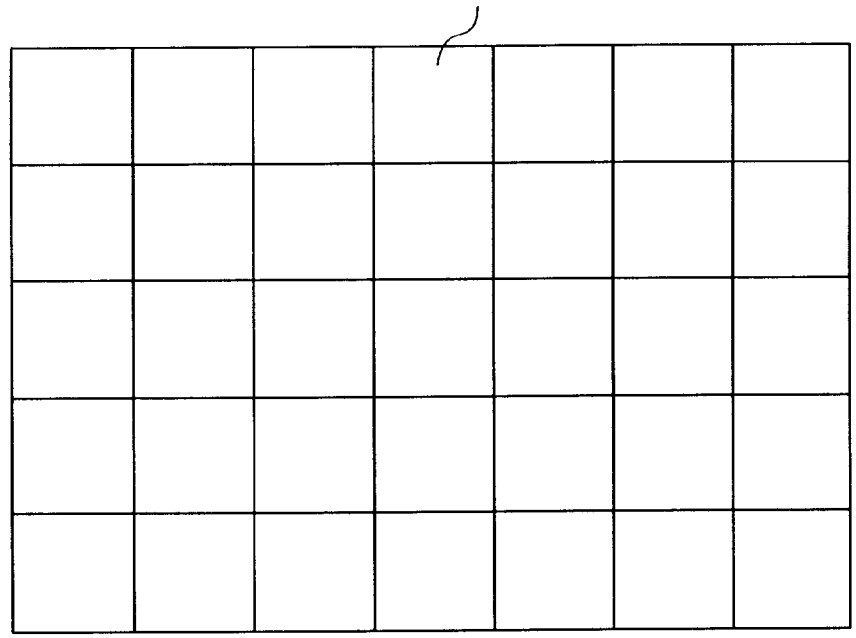
FIG. 20 is an enlarged schematic partial plan view of an image projected on the display screen of a projection type display apparatus according to the invention.

FIG. 19 is a block diagram of the drive circuit system of the projection type liquid crystal display apparatus of this example.

Referring to FIG. 19, there are shown a panel driver 10 for producing R, G B video signals along with drive signals for driving the opposite electrode 24 and various timing signals, an interface 12 for decoding video signals and control transmission signals into corresponding standard video signals and so on, a decoder 11 for decoding standard video signals from the interface 12 into primary color signals of R, G and B and synchronizing signals, a ballast 14 for driving an arc lamp 8 to emit light and a power supply circuit 15 for feeding the circuit blocks with power. Reference numeral 13 denotes a controller comprising an operating section (not shown) for controlling the operations of the circuit blocks.

A projection type liquid crystal display apparatus as described above can display clear and bright images without showing the mosaic arrangement of R, G and B pixels.

Figure 21:
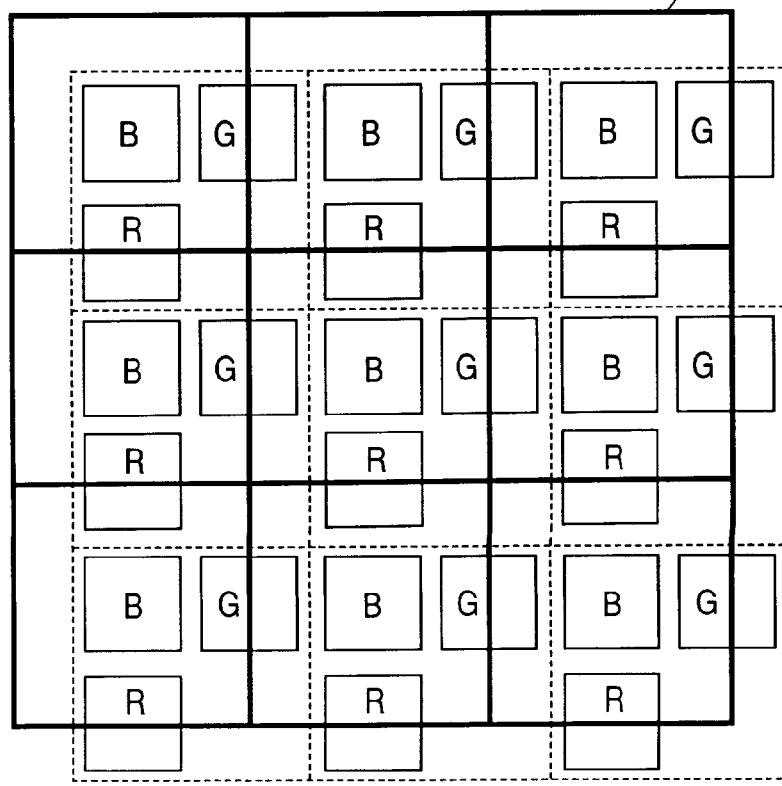
FIG. 21 is an enlarged schematic partial plan view of a liquid crystal panel according to the invention.

FIG. 21 is an enlarged schematic plan view of a modified example of liquid crystal according to the invention. In this example, B pixels are arranged directly below the centers of the respective micro lenses 22 as primary color pixels, whereas G pixels are arranged alternately with the B pixels along the lateral direction as secondary pixels and R pixels are arranged also alternately with the B pixels along the vertical direction as ternary pixels.

With such an arrangement again, rays of B light are made to perpendicularly strike a corresponding pixel unit while those of R/G light are made to strike aslant the pixel unit (in different directions with a same angle of incidence) so that the reflected rays of light leave the pixel unit through a same and common micro lens. Thus, the net result will be exactly same as the preceding example. Alternatively, it may be so arranged that R pixels are arranged directly below the centers of the respective micro lenses 22 as primary pixels and the remaining pixels are arranged alternately and respectively along the lateral and vertical directions.

Embodiment 3

This embodiment is obtained by modifying Embodiment 2 as will be described below.

FIG. 22 is an enlarged schematic cross sectional view of the liquid crystal panel 20 of this example, showing a principal area thereof. This liquid crystal panel differs from its counterpart Embodiment 2 in that a sheet glass 23 is used for the opposite glass substrate and micro lenses 220 are formed by laying thermoplastic resin on the sheet glass 23 by means of a so-called reflow technique. Additionally, column spacers 251 are arranged in non-pixel areas. The spacers are made of photosensitive resin and produced by photolithography.

Figure 23A:
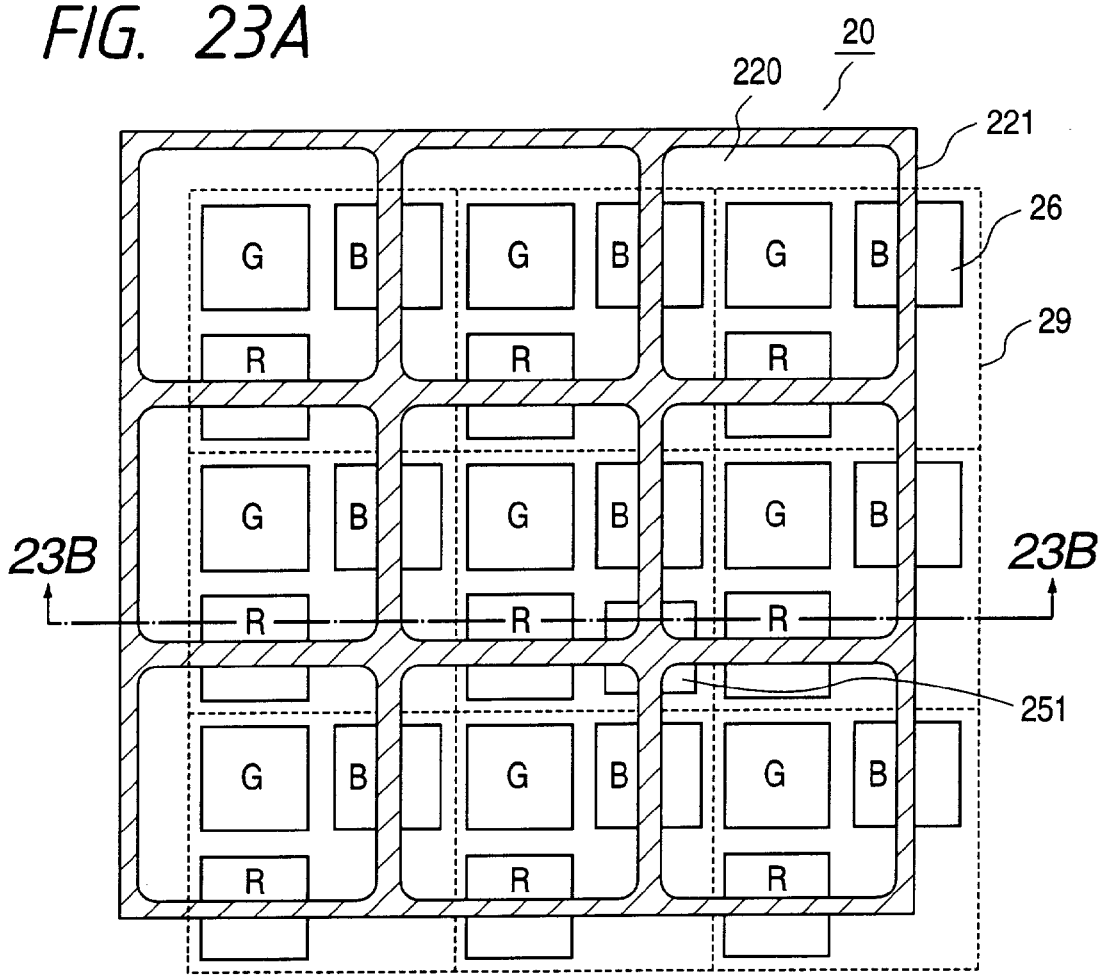
FIGS. 23A and 23B are an enlarged schematic partial plan view and an enlarged schematic cross sectional side view of a liquid crystal panel according to the invention.
Figure 23B:
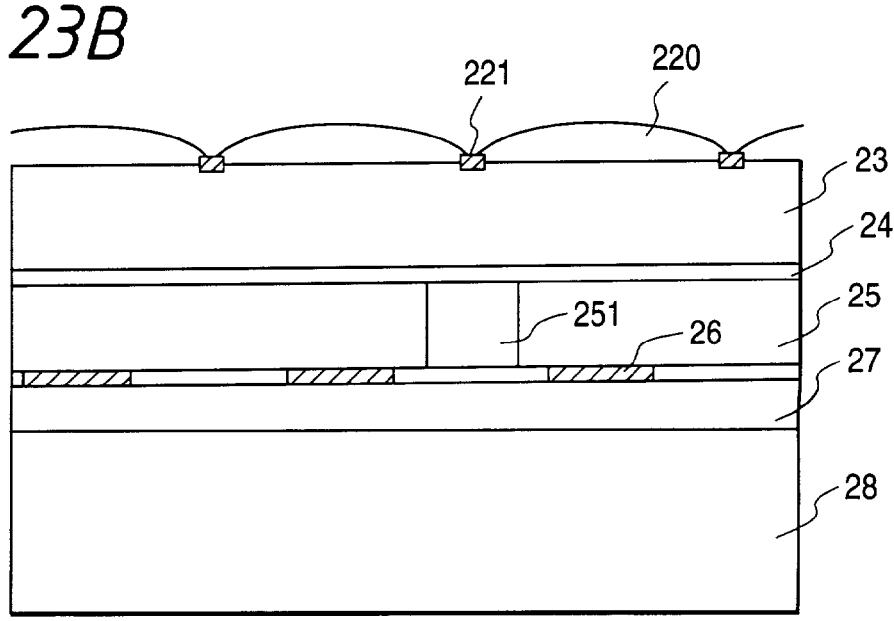

FIG. 23A is a schematic partial plan view of the liquid crystal panel 20. As shown, the column spacers 251 are arranged in non-pixel areas located at the corners of the micro lenses 220 at a predetermined pitch as a function of the pixel arrangement. FIG. 23B shows a cross sectional view taken along a line 23B—23B passing through a column spacer 251. Column spacers 251 are preferably arranged at a pitch corresponding to 10 to 100 pixels to show a matrix of spacers. The arrangement of column spacers has to meet the requirement of flatness of the sheet glass 23 and that of injectability of liquid crystal, which are contradictory to the provision of spacers.

The apparatus of this example additionally comprises a light shielding layer 221 which is a patterned metal film for preventing any leak light from entering the inside through the boundary zones of the micro lenses. This arrangement can effectively prevent degraded color saturation and contrast of the projected image due to leak light. Thus, the apparatus of this example comprising a liquid crystal panel according to the invention can display clearly defined high quality images.

What is claimed is:

1. A matrix substrate comprising a pixel region formed by arranging a plurality of pixel electrodes to a matrix, drive circuit regions for feeding said pixel electrodes with electric signals and sealing regions, wherein:

gaps separating said pixel electrodes are filled with insulation members of an insulating material to provide a continuous even surface, said even surface connecting those of the pixel electrodes and members of the material of said pixel electrodes and those of the material of said insulation members, and wherein members of the material of said pixel electrodes and those of the material of said insulating members are arranged at least either in said drive circuit regions or in said sealing regions to provide a continuous even surface there.

2. A matrix substrate according to claim 1, wherein the surface of said pixel electrodes and that of said insulation members are flush with each other to provide a continuous plane surface.

3. A matrix substrate according to claim 2, wherein the surface of said members of the material of said insulation members and that of said members of the material of said pixel electrodes are flush with each other to provide a continuous plane surface.

4. A matrix substrate according to claim 1, wherein the surface of said members of the material of said insulation members and that of said members of the material of said pixel electrodes are flush with each other to provide a continuous plane surface.

5. A matrix substrate according to any of claims 1 through 4, wherein the surface of said pixel electrodes, that of said insulation members, that of said members of the material of said pixel electrodes and that of said members of the material of said insulation members are polished by chemical mechanical polishing.

6. A matrix substrate according to claim 1, wherein a light shielding layer is arranged below said pixel electrodes.

7. A matrix substrate according to claim 1, wherein said pixel electrode comprises at least one material selected from a group consisting of Al, AlSi, AlSiCu, AlGeCu, AlC, Ti, Ta, W, Cr, Au and Ag, or compounds of any of these materials.

8. A matrix substrate according to claim 1, wherein said insulation member comprises at least one material selected from a group consisting of $SiO_2$, silicon oxide, phospho-silicate glass, nondoped silicate glass, SiN and $Ta_2O_5$.

9. A matrix substrate according to claim 1, wherein a thickness of said insulation member is in a range of 500 to 20,000 angstroms.

10. A matrix substrate according to claim 1, wherein said pixel electrode is a reflection electrode.

11. A matrix substrate according to claim 1, wherein a shielding member is disposed corresponding to said pixel electrode.

12. A matrix substrate according to claim 11, wherein a charge holding capacitor is formed between said shielding member and said pixel electrode.

13. A liquid crystal apparatus comprising a matrix substrate including a pixel region formed by arranging a plurality of pixel electrodes to a matrix, drive circuit regions for feeding said pixel electrodes with electric signals and sealing regions, an opposite substrate disposed vis-a-vis said pixel region and a liquid crystal material held between said pixel region and said opposite substrate, wherein:

gaps separating said pixel electrodes are filled with insulation members of an insulating material to provide a continuous even surface, said even surface connecting those of the pixel electrodes and members of the material of said pixel electrodes and those of the material of said insulation members, and wherein members of the material of said pixel electrodes and those of the material of said insulating members are arranged at least either in said drive circuit regions or in said sealing regions to provide a continuous even surface there.

14. A liquid crystal apparatus according to claim 13, wherein the surface of said pixel electrodes and that of said insulation members are flush with each other to provide a continuous plane surface.

15. A liquid crystal apparatus according to claim 14, wherein the surface of said members of the material of said insulation members and that of said members of the material of said pixel electrodes are flush with each other to provide a continuous plane surface.

16. A liquid crystal apparatus according to claim 13, wherein the surface of said members of the material of said insulation members and that of said members of the material of said pixel electrodes are flush with each other to provide a continuous plane surface.

17. A liquid crystal apparatus according to any of claims 13 through 15, wherein the surface of said pixel electrodes, that of said insulation members, that of said members of the material of said pixel electrodes and that of said members of the material of said insulation members are polished by chemical mechanical polishing.

18. A liquid crystal apparatus according to claim 13, wherein a light shielding layer is arranged below said pixel electrodes.

19. A display apparatus characterized by comprising a liquid crystal apparatus according to claim 13.

20. A display apparatus according to claim 19, wherein a reflection type liquid crystal panel is used for the liquid crystal apparatus so that light emitted from a light source is made to irradiate the liquid crystal panel and reflected light is made to irradiate the screen by way of an optical system.

21. A display apparatus according to claim 19, wherein said display apparatus is a projector.

22. A liquid crystal apparatus according to claim 7, wherein said pixel electrode comprises at least one material selected from a group consisting of Al, AlSi, AlSiCu, AlGeCu, AlC, Ti, Ta, W, Cr, Au and Ag, or compounds of any of these materials.

23. A liquid crystal apparatus according to claim 13, wherein said insulation member comprises at least one material selected from a group consisting of $SiO_2$, silicone oxide, phospho-silicate glass, nondoped silicate glass, SiN and $Ta_2O_5$.

24. A liquid crystal apparatus according to claim 13, wherein a thickness of said insulation member is in a range of 500 to 200,000 angstroms.

25. A liquid crystal apparatus according to claim 13, wherein said pixel electrode is a reflection electrode.

26. A liquid crystal apparatus according to claim 13, wherein a shielding member is disposed corresponding to said gap separating said pixel electrode.

27. A liquid crystal apparatus according to claim 13, wherein a charge holding capacitor is formed between said shielding member and said pixel electrode.

28. A method of manufacturing a maxtrix substrate comprising a pixel region formed by arranging a plurality of pixel electrodes to a matrix, drive circuit regions for feeding said pixel electrodes with electric signals and sealing regions, characterized by comprising the steps of:

forming a semiconductor device region to be connected with said pixel electrodes and said drive circuit regions on a substrate for forming a maxtrix substrate and subsequently forming an insulation layer on said semiconductor device region, said drive circuit regions and said regions for forming sealing regions;

producing by patterning grooves for forming pixel electrodes in said insulation layer on said pixel region and those to be filled with the material of said pixel electrodes at least either in said insulation layer on said drive circuit regions or on said sealing regions;

depositing the material of said pixel electrodes in said grooves of two different types; and polishing the surface of the deposit of said material of said pixel electrodes until said insulation layer and the material of said picel electrode provide a continuous even surface.

29. A method of manufacturing a matrix substrate according to claim 28, wherein said polishing step involves chemical mechanical polishing.

30. A method of manufacturing a matrix substrate according to claim 28, wherein said operation of patterning the insulation layer includes an etching operation using $CF_4/CHF_3$ gas.

31. A method of manufacturing a matrix substrate according to claim 30, wherein said etching operation is connected under pressure blow 1.0 Torr.

32. A method of manufacturing a matrix substrate according to claim 28, wherein said pixel electrode comprises at least one material selected from a group consisting of Al, AlSi, AlSiCu, AlGeCu, AlC, Ti, Ta, W, Cr, Au and Ag, or compounds of any of these materials.

33. A method of manufacturing a matrix substrate according to claim 28, wherein said insulation layer comprises at least one material selected from a group consisting of $SiO_2$, silicon oxide, phosphosilicate glass, nondoped silicate glass, SiN and $Ta_2O_5$.

34. A method of manufacturing a matrix substrate according to claim 28, wherein a thickness of said insulation layer is in a range of 500 to 20,000 angstroms.

35. A method of manufacturing a liquid crystal apparatus comprising a maxtrix substrate including a pixel region formed by arranging a plurality of pixel electrodes to a matrix, drive circuit regions for feeding said pixel electrodes with electronic signals and sealing regions, an opposite substrate disposed vis-a-vis said pixel region and a liquid crystal material held between said pixel region and said opposite substrate, characterized by comprising steps:

forming a semiconductor device region to be connected with said pixel electrodes and said drive circuit regions on a substrate for forming a matrix substrate and subsequently forming an insulation layer on said semiconductor device region, said drive circuit regions and said regions for forming sealing regions;

producing by patterning grooves for forming pixel electrodes in said insulation layer on said pixel region and those to be filled with the material of said pixel electrodes at least either in said insulation layer on said drive circuit regions or on said sealing regions;

depositing the material of said pixel electrodes in said grooves of two different types; and polishing the surface of the deposit of said material of said pixel electrodes until said insulation layer and the material of said pixel electrode provide a continuous even surface.

36. A method of manufacturing a liquid crystal apparatus according to claim 35, wherein said polishing step involves chemical mechanical polishing.

37. A method of manufacturing a liquid crystal apparatus according to claim 35, wherein said operation of patterning the insulation layer includes an etching operation using $CF_4/CHF_3$ gas.

38. A method of manufacturing a liquid crystal apparatus according to claim 35, wherein said etching operation is conducted under pressure blow 1.0 Torr.

39. A method of manufacturing a liquid crystal apparatus according to claim 35, wherein said pixel electrode comprises at least one material selected from a group consisting of Al, AlSi, AlSiCu, AlC, Ti, Ta, W, Cr, Au and Ag, or compounds of any of these materials.

40. A method of manufacturing a liquid crystal apparatus according to claim 35, wherein said insulation lever comprises at least one material selected from a group consisting of $SiO_2$, silicon oxide, phospho-silicate glass, nondoped silicate glass, SiN and $Ta_2O_5$.

41. A method of manufacturing a liquid crystal apparatus according to claim 35, wherein a thickness of said insulation layer is in a range of 500 to 20,000 angstroms.

* * * * *

UNITED STATES PATENT AND TRADEMARK OFFICE
CERTIFICATE OF CORRECTION

PATENT NO. : 6,157,429
DATED : December 5, 2000
INVENTOR(S) : Mamoru Miyawaki et al.

It is certified that error appears in the above-identified patent and that said Letters Patent is hereby corrected as shown below:

Title Page,
Item[56] References Cited, under FOREIGN PATENT DOCUMENTS,
"8178711" should read -- 8-178711 --; and
"8179377     7/1966  Japan" should be deleted.

Column 2,
Line 2, "above described" should read -- above-described --; and
Line 5, "above-described" should read -- above described --.

Column 5,
Line 53, "cross sectional" should read -- cross-sectional --;
Line 55, "cross sectional" should read -- cross-sectional --; and
Line 57, "cross sectional" should read -- cross-sectional --.

COLUMN 6:
Line 14, "cross sectional" should read -- cross-sectional --;
Line 29, "cross sectional" should read -- cross-sectional --;
Line 48, "cross sectional" should read -- cross-sectional --;
Line 51, "cross sectional" should read -- cross-sectional --;
Line 53, "cross sectional" should read -- cross-sectional --;
Line 61, "cross sectional" should read -- cross-sectional --; and
Line 65, "cross sectional" should read -- cross-sectional --.

Column 7,
Line 1, "cross" should read -- cross --.

Column 9,
Line 42, "rage)" should read -- rag) --.

Column 10,
Line 21, "cross sectional" should read -- cross-sectional --.

UNITED STATES PATENT AND TRADEMARK OFFICE
CERTIFICATE OF CORRECTION

PATENT NO. : 6,157,429
DATED : December 5, 2000
INVENTOR(S) : Mamoru Miyawaki et al.

It is certified that error appears in the above-identified patent and that said Letters Patent is hereby corrected as shown below:

Column 11,
Line 57, "above described" should read -- above-described --.

Column 12,
Line 23, "cross sectional" should read -- cross-sectional --.

Column 16
Line 25, "that" should be deleted.

Column 21,
Line 26, "by" should be deleted

Column 22,
Line 41, "cross sectional" should read -- cross-sectional --; and
Line 56, "cross sectional" should read -- cross-sectional --.

Column 24,
Line 52, "cross sectional" should read -- cross-sectional --; and
Line 66, "cross sectional" should read -- cross-sectional --.

Column 26,
Line 36, "through 15," should read -- through 16, --.

Column 27,
Line 4, "claim 13," should read -- claim 26 --; and
Line 27, "picel" should read -- pixel --; and
Line 38, "blow" should read -- below --.

UNITED STATES PATENT AND TRADEMARK OFFICE
CERTIFICATE OF CORRECTION

PATENT NO.    : 6,157,429
DATED         : December 5, 2000
INVENTOR(S)   : Mamoru Miyawaki et al.

It is certified that error appears in the above-identified patent and that said Letters Patent is hereby corrected as shown below:

Column 28,
Line 36, "blow" should read -- below --; and
Line 43, "lever" should read -- layer --.

Signed and Sealed this

Eighteenth Day of December, 2001

Attest:

Attesting Officer

JAMES E. ROGAN
*Director of the United States Patent and Trademark Office*